US012187005B2

(12) United States Patent
Burright

(10) Patent No.: US 12,187,005 B2
(45) Date of Patent: Jan. 7, 2025

(54) H-BOT CASE ERECTOR

(71) Applicant: Pearson Packaging Systems, Spokane, WA (US)

(72) Inventor: Joshua A. Burright, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 0 days.

(21) Appl. No.: 18/100,837

(22) Filed: Jan. 24, 2023

(65) Prior Publication Data

US 2023/0234316 A1 Jul. 27, 2023

Related U.S. Application Data

(60) Provisional application No. 63/303,366, filed on Jan. 26, 2022.

(51) Int. Cl.
*B31B 50/00* (2017.01)

(52) U.S. Cl.
CPC .................................. *B31B 50/005* (2017.08)

(58) Field of Classification Search
CPC ....... B31B 50/005; B31B 50/06; B31B 50/76; B31B 50/78; B31B 50/784; B31B 50/787; B31B 50/80; B31B 50/804
USPC .......................................... 493/309; 943/309
See application file for complete search history.

(56) References Cited

U.S. PATENT DOCUMENTS

| | | | | |
|---|---|---|---|---|
| 4,553,954 | A * | 11/1985 | Sewell | B31B 50/006 493/122 |
| 6,106,450 | A * | 8/2000 | Brittain | B31B 50/78 493/171 |
| 11,628,644 | B2 * | 4/2023 | Maeyaert | B31B 50/734 493/76 |
| 2006/0096242 | A1 * | 5/2006 | Makar | B31B 50/726 53/136.1 |
| 2009/0093355 | A1 * | 4/2009 | Huang | B65B 43/265 493/309 |
| 2010/0263333 | A1 * | 10/2010 | Langen | B65D 5/02 53/563 |
| 2020/0198281 | A1 * | 6/2020 | Hill | B31B 50/26 |
| 2023/0374775 | A1 * | 11/2023 | Stewart | E04B 1/3511 |
| 2023/0391039 | A1 * | 12/2023 | Langen | B31B 50/062 |

* cited by examiner

*Primary Examiner* — Sameh Tawfik
(74) *Attorney, Agent, or Firm* — Lee & Hayes, P.C.

(57) ABSTRACT

Techniques for erecting folded-flat cases are described herein. In a first example, a grasping tool is moved along a supporting beam in two directions in a first dimension. The supporting beam is configured for movement along first and second beams two directions in a second dimension. The grasping tool is configured to grasp and open a folded-flat case. In a second example, the grasping tool is configured with a rotation arm. A rotation-control beam defines a track, within which a pin connected to the rotation arm is configured to slide. A motor drives the rotation-control beam in two directions in one dimension, to thereby rotate the grasping tool.

12 Claims, 34 Drawing Sheets

H-BOT CASE ERECTOR

RELATED APPLICATIONS

This patent application claims benefit of priority to U.S. patent application Ser. No. 63/303,366, titled "H-Bot Case Erector", filed on Jan. 26, 2022, which is incorporated herein by reference.

BACKGROUND

Cardboard boxes are sold in a folded-flat form, to save space. Case erector machinery "erects" each case in a sequence of moves. Once erected, the bottom flaps may be taped or glued shut, the case may be filled with product (e.g., cans, boxes, or bags of food or beverage, etc.), and the top flaps may be sealed shut. While machinery to do these tasks is available, the packaging industry continues to look for faster, more accurate, and more reliable case erecting machinery.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview of an H-Bot Assembly Applied to Case Erection

Figure 1:
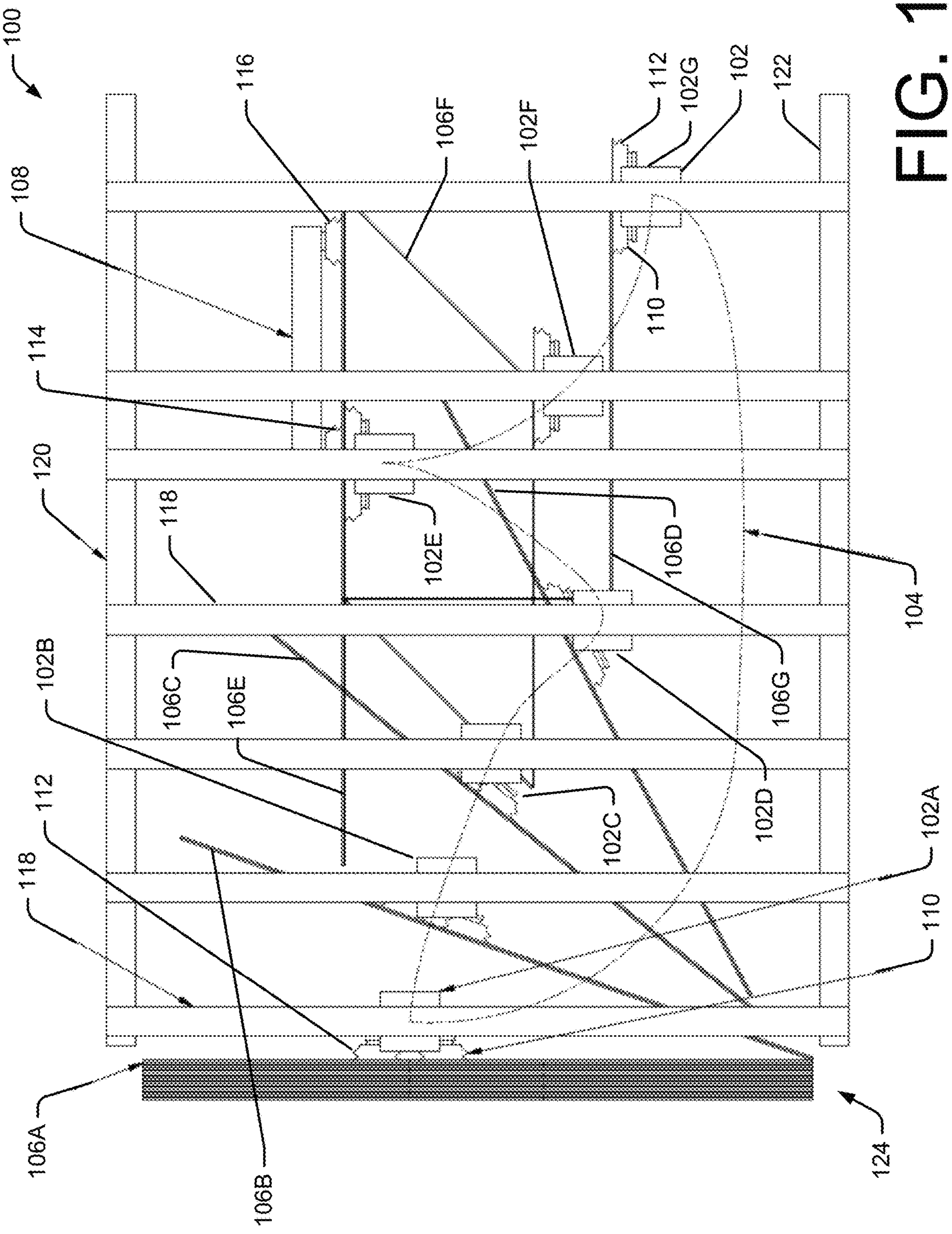
FIG. 1 is a top view of a system configured to move a tool to positions defined by their locations on the X- and Y-axes, and configured to pickoff and erect cases (in the example "left hand" cases), showing a sequence of positions of machinery elements, and a path-of-movement profile of case travel in a superimposed manner (i.e., multiple views of a device or component, associated with a respective multiple times, compressed into a single image).

A first example is seen in FIGS. 1-18, wherein an H-Bot assembly is configured to perform case-erection activities. As seen in FIG. 1, an H-Bot moves a grasping tool through complex—at times curving—motions to erect (i.e., open) a folded-flat case. The case may be a carton, box, container, etc., and may be made of "cardboard" or other material. In an example, the grasping tool may be moved in "north" and/or "south" direction(s) along a "north-south" oriented supporting beam. The grasping tool may be used to grasp, move, and erect a folded-flat case. The north and/or south movements may be made at pre-scheduled times according to programming defined on a memory device and executed by a processor. The north-south supporting beam may be moved "east" and/or "west" within an activity region of the H-bot (again, based on programming). Accordingly, by moving the grasping tool in the north and/or south direction(s) along the supporting beam, and by simultaneously moving the supporting beam in the east and/or west directions within the activity region of the H-bot, the grasping tool may be located at any desired location at any time. Moreover, complex movements (e.g., curving movements) of the grasping tool may be performed.

Figure 2:
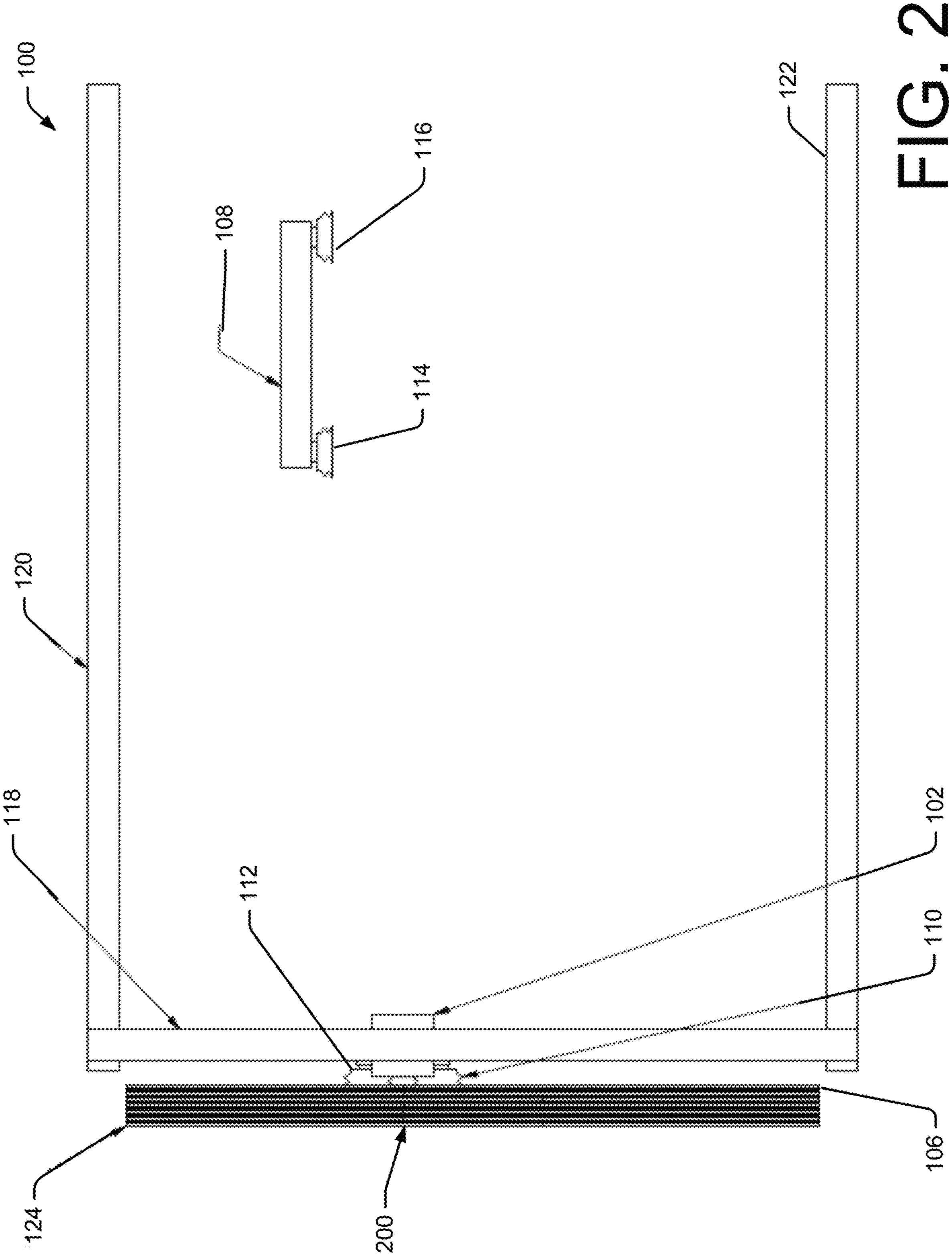
FIG. 2 shows a top view, wherein a tool having suction cups is in a position to pickoff (i.e., grasp) a case.
Figure 6:
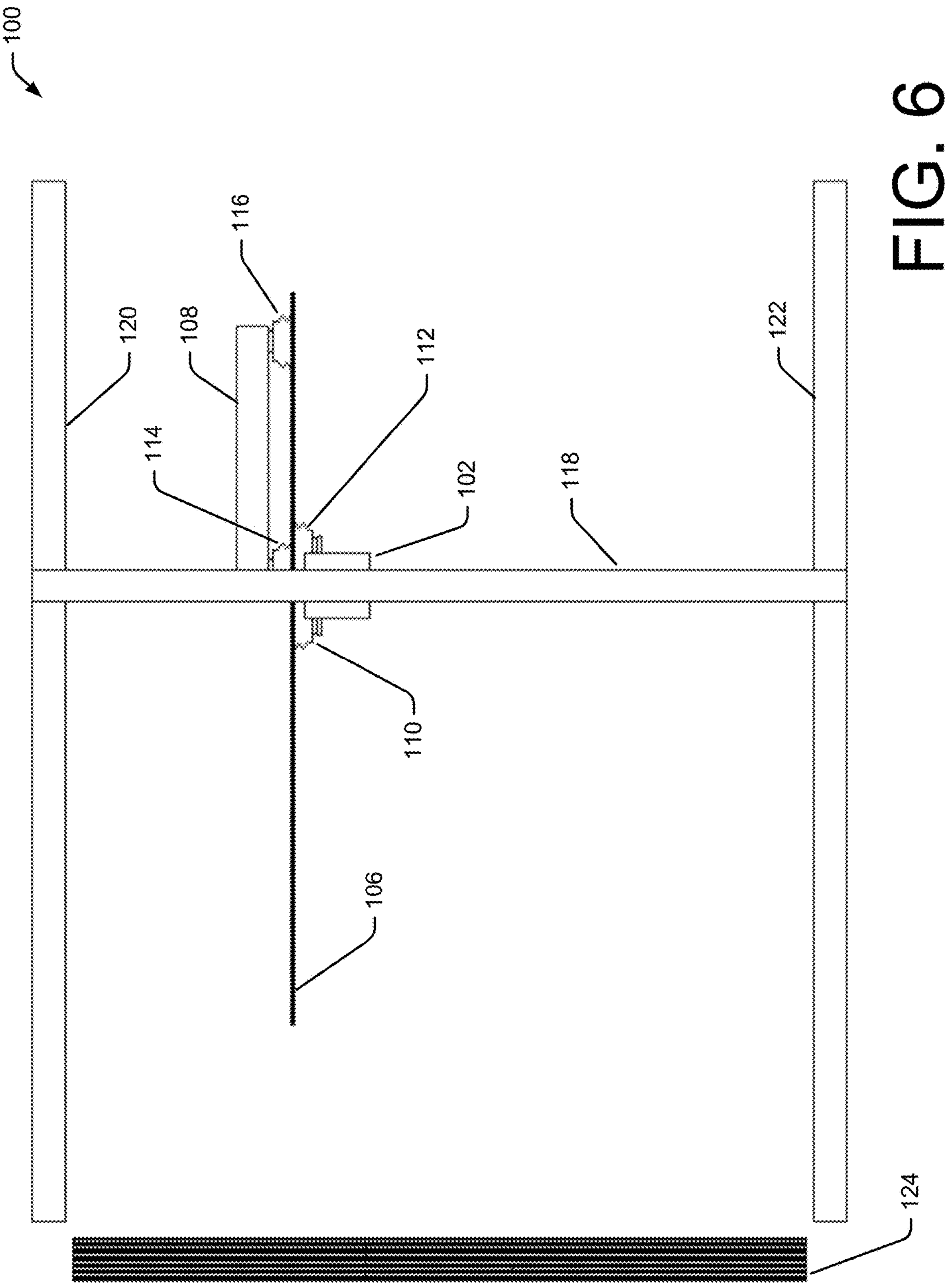
FIG. 6 shows a top view, wherein the case is placed into contact with a second tool (e.g., a stationary grasping tool), i.e., the case is in an initial position for case erection.
Figure 7:
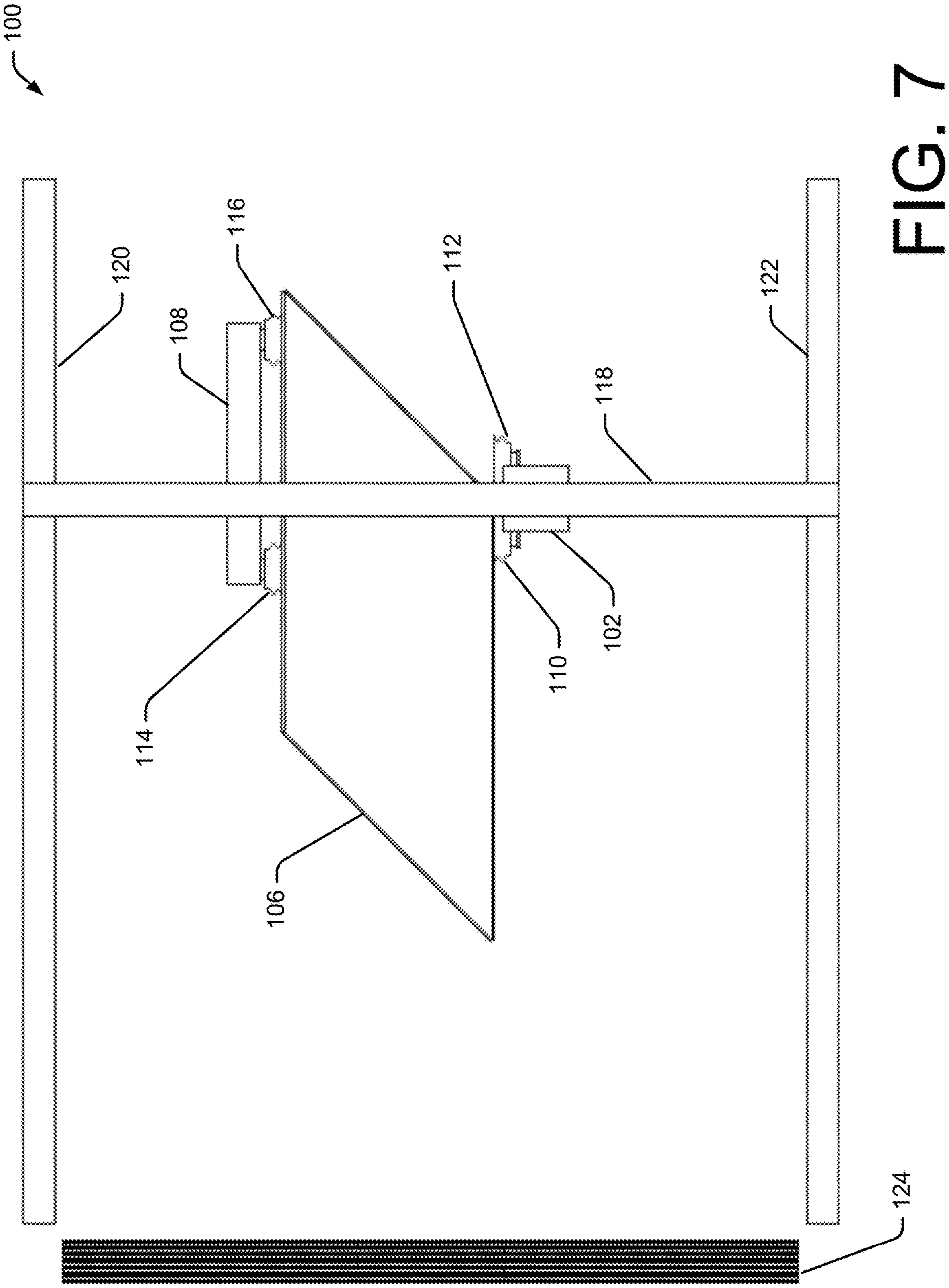
FIG. 7 shows a top view, wherein the second tool remains stationary, and movement of the tool causes the case to begin to open.
Figure 8:
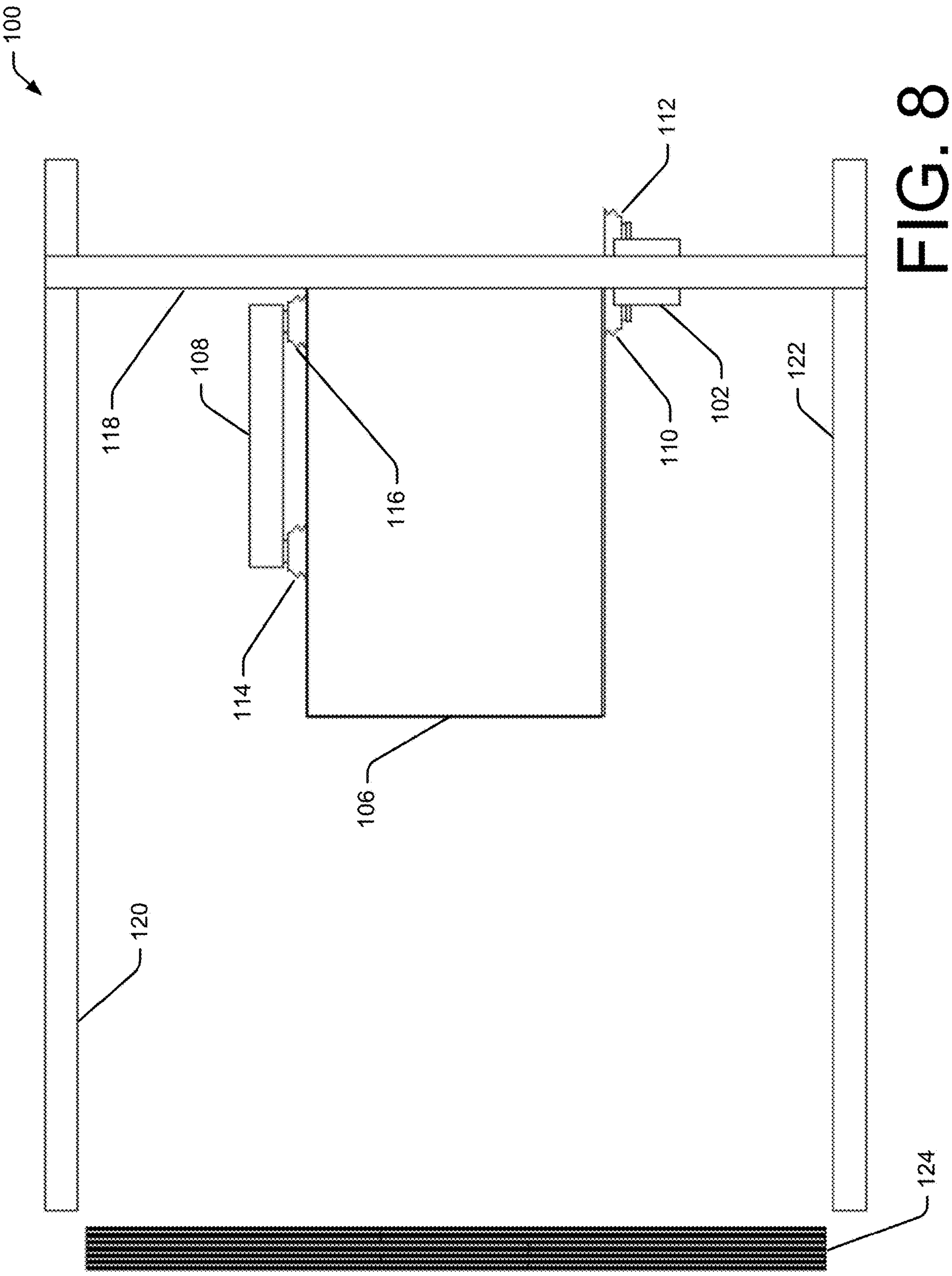
FIG. 8 shows a top view, wherein the second tool remains stationary, and movement of the tool has caused the case to fully open.

In the example, the grasping tool may be configured with (for example) four suction cups that may be controlled individually (or in pairs), such as by valves connected to a partial vacuum source. As seen in FIG. 2, movement of the grasping tool in both the X-direction and the Y-direction (e.g., by operation of the H-Bot tool) cause the grasping tool to move into a position to grasp the folded-flat case. Having grasped the case with suction cups, movement of the grasping tool causes the case to be rotated 90-degrees and moved horizontally (FIGS. 3-5) to bring the case into contact with a stationary tool (FIG. 6). The stationary tool (e.g., using suction cups) grasps a side of the case opposite to a side of the case grasped by the grasping tool. The grasping tool may then release one panel of the case (such as by releasing a partial vacuum to suction cups) to allow the case to open. The results of the release are seen in FIG. 7, where the suction cups, previously attached to the minor sidewall have been released. In the example, the stationary tool may be held in a fixed (i.e., stationary) location while the grasping tool continues to move, thereby opening the case partially (as seen in FIG. 7) and then fully (as seen in FIG. 8). Accordingly, in the first example, the H-bot uses (possibly simultaneous) X-axis and Y-axis movement(s) to move the grasping tool in a manner that opens the case. In a further example, the stationary tool may be moved simultaneously with the grasping tool (i.e., the stationary tool may be replaced by a moving tool, possibly moved by a second H-bot assembly). This may open the case more rapidly, but may require a more complex design with greater manufacturing costs.

Overview of a Virtual Cam Path Mechanism

Figure 19:
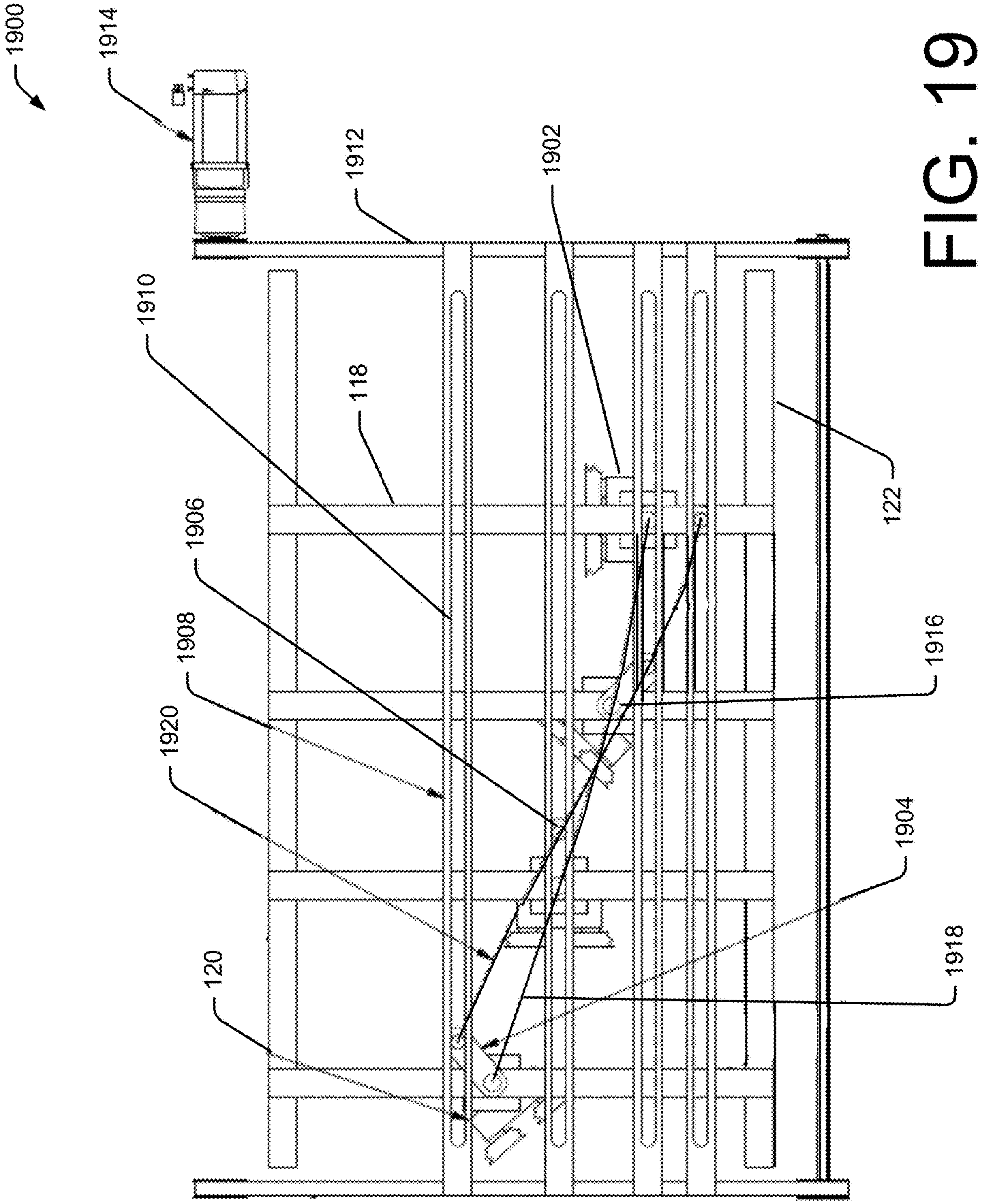
FIG. 19 shows a top view for erecting "right hand" cases (in contrast to the "left hand" cases of FIG. 1), wherein a virtual cam path mechanism is rotating a tool (e.g., a grasping tool), and shows positions of the tool and path profiles, superimposed.

A second example is seen in FIGS. 19-23. In the example, techniques provide for a "virtual cam path mechanism" that is used to control the orientation of a tool without a motor attached to the tool, to rotate that tool. The virtual cam path mechanism provides control over an angle at which a tool (e.g., the "grasping tool" of example one, above) is orientated, yet does not require a motor attached directly to the tool and/or an associated wiring harness to be provided to the motor. In the example of FIG. 19, the tool is connected to, and supported by (e.g., by roller bearings or similar), a "north-south" oriented supporting beam. The tool is movable along the north-south beam in the north-south directions, such as by operation of a first motor or other powering device. The north-south beam is movable in the east-west directions, such as by operation of a second motor or other powering device. Accordingly, the tool may be located in any location in the X, Y grid.

Additionally, an orientation of the tool is controllable by an angle of an arm. The arm may have a first end in a fixed relationship to the tool. As a second end of the arm is rotated, the tool is rotated. The second end of the arm may have an axle that travels in a slot defined in an "east-west" oriented guide beam. The east-west oriented guide beam may be moved in the north-south direction during operation. (Note: A "north-south" oriented guide beam could alternatively be used, and moved in the east-west direction.)

Accordingly, the location and angle of the tool may be controlled by: (1) moving the tool in the north-south direction along the north-south oriented support beam; (2) moving the east-west location of the north-south oriented support beam; and (3) moving the north-south location of the east-west oriented slotted guide beam. Accordingly, using a slotted guide beam, the H-Bot is able to control the orientation of the tool, thereby obviating the need for a motor attached directly to the tool and a wiring harness directly attached to the tool as it moves.

Overview Chain Guides Pivoting to Allow Case-Erection

A third example is seen in FIGS. 24-30. In the example, techniques provide for providing pivoting chain guides that move (e.g., pivot) to provide additional space for a case to be reoriented spatially. As seen in the first example, above, the folded-flat case is rotated 90-degrees. A space large enough for this maneuver must be provided. However, the left and right chain guides of a type frequently used to propel the opened case are typically separated by a distance approximately equal to a length of a short side of the case. The space associated with this distance is inadequate for the maneuver. One solution is to erect the case above the chain guides, and lower the erected case to a position between the chain guides. However, this vertical movement takes time and machinery to complete. Another solution is to erect the case in front of the chain guides and move the erected case in the direction of, and into contact with, the chain guides. However, this horizontal movement also takes time, added floorspace (as compared to the vertical solution), and machinery to complete.

Figure 24:
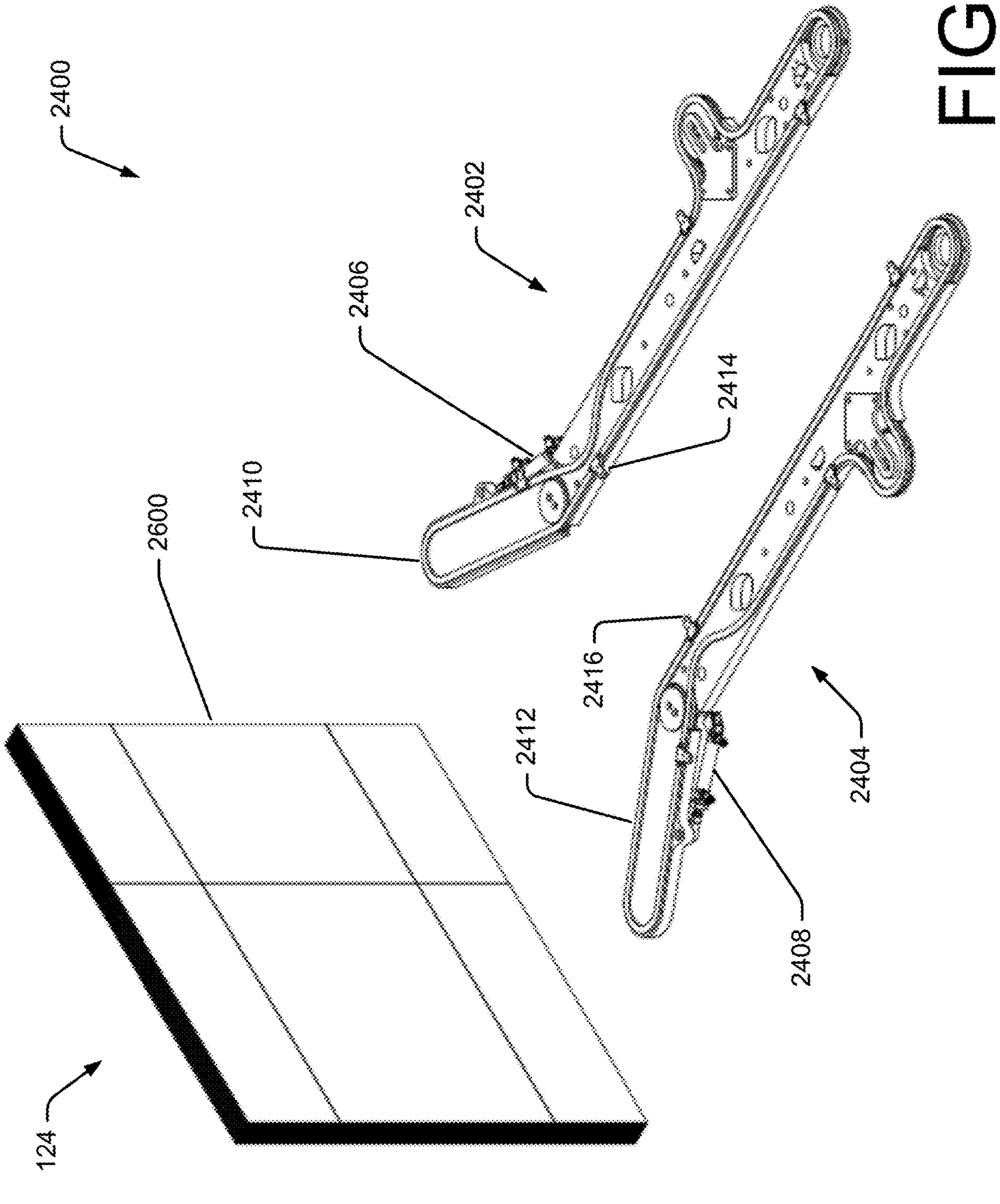
FIG. 24 is an isometric view of pivoting chain guides in an open position to provide space to erect a case.

In the solution of FIGS. 24-30, an "upstream" portion of each of the left and right chain guides pivots to provide an area within which a case may be rotated and/or erected. FIG. 24 shows the left and right chain guides in the open position to provide an area for erection of a case. The rack (cassette, and/or magazine) of folded-flat cases is shown in the upper left of the figure.

Figure 25:
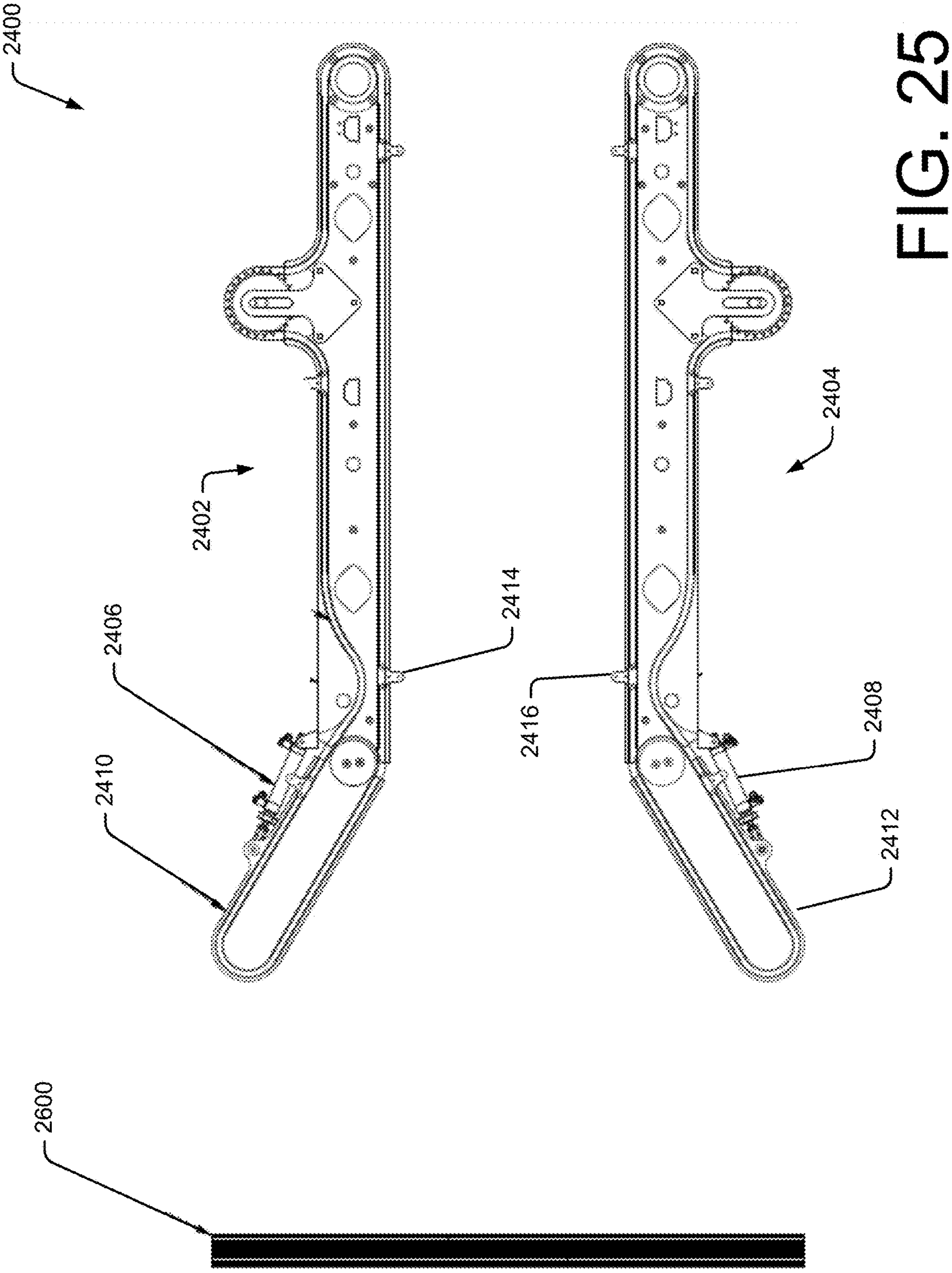
FIG. 25 shows a top view of the pivoting chain guide system or assembly configured to move between an open position (shown) to allow space to erect a case and a closed position to convey the erected case.
Figure 26:
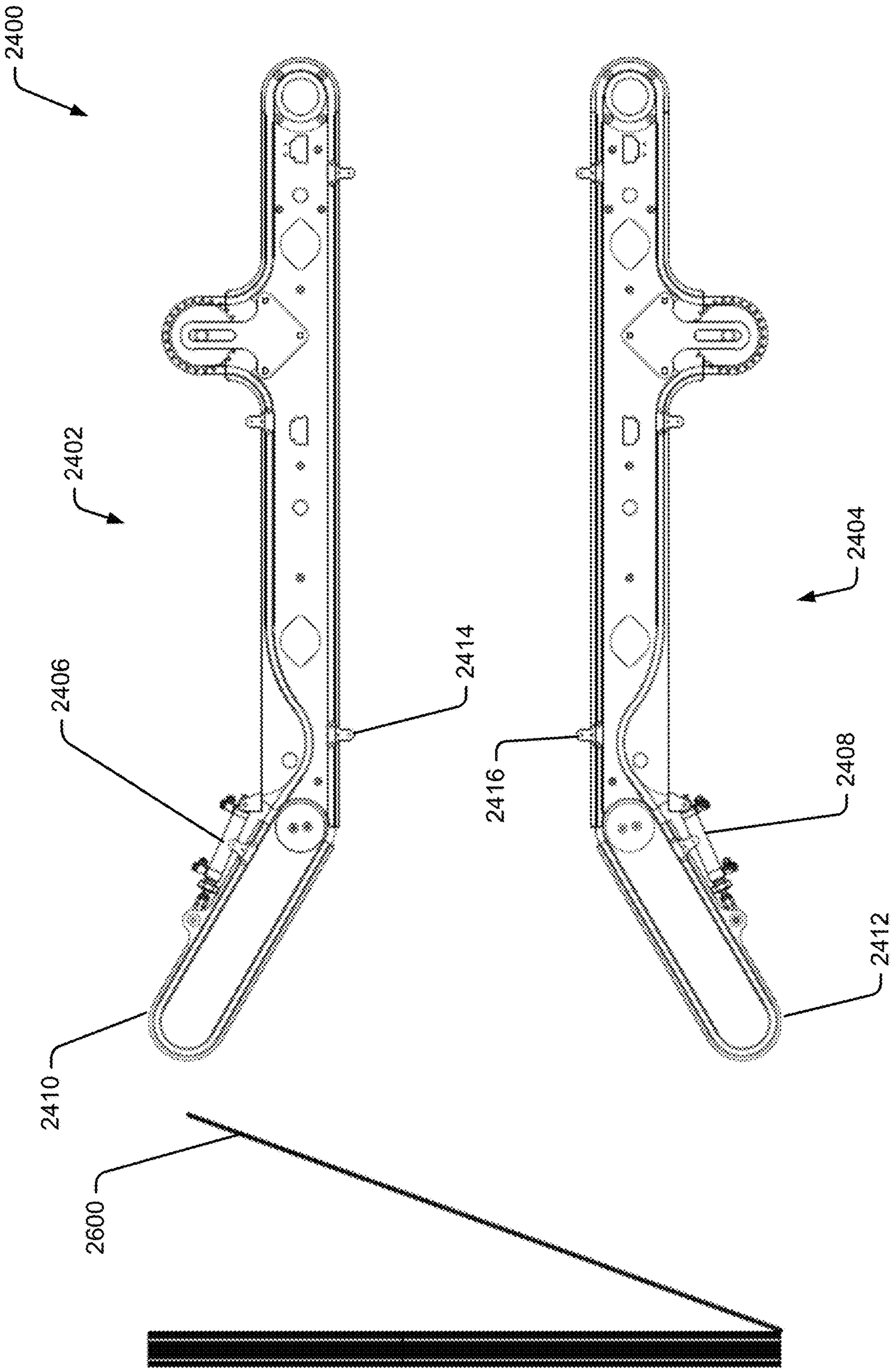
FIG. 26 is a top view, showing a first position of a knocked down case with the guide in the open position.
Figure 27:
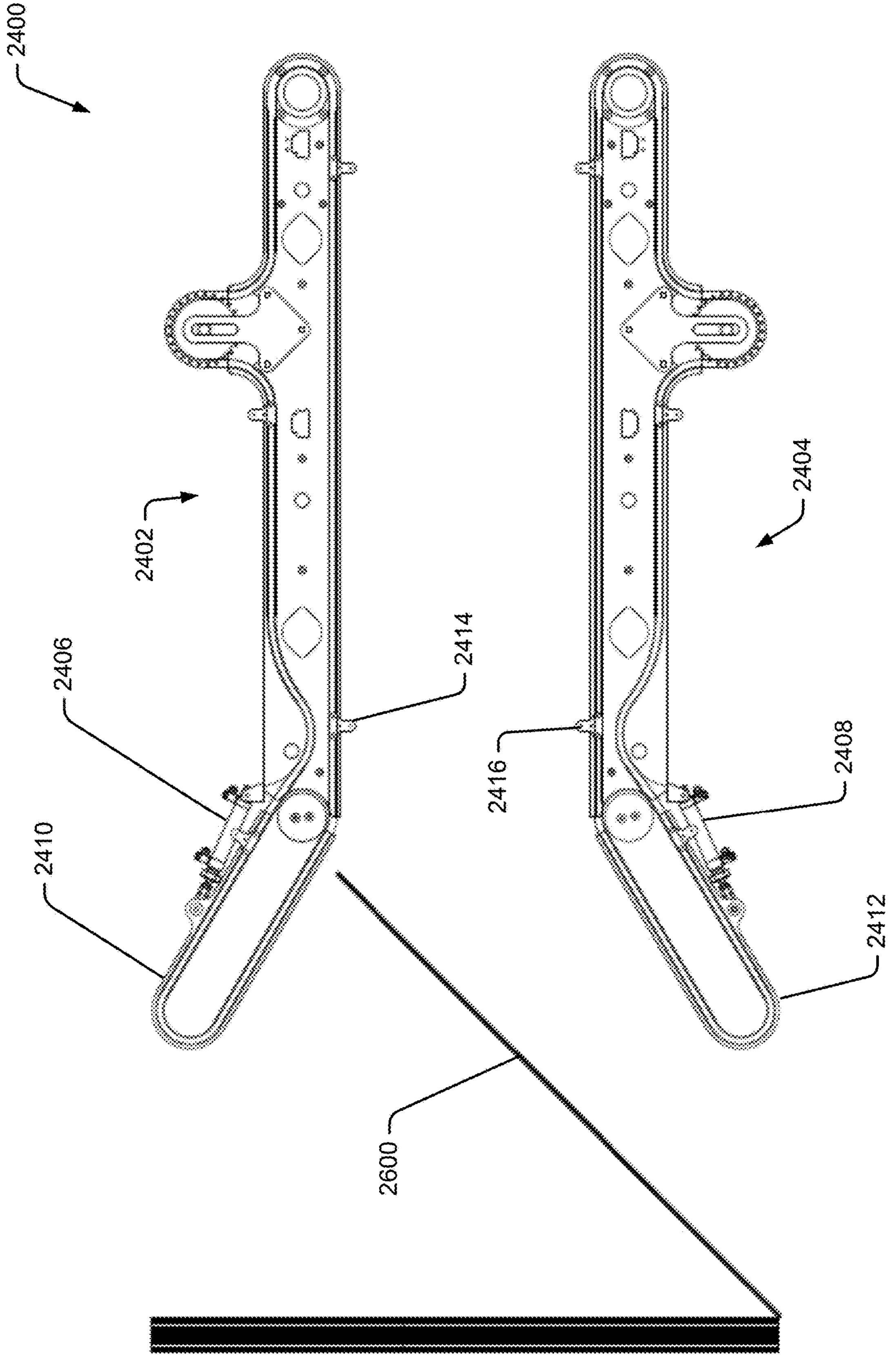
FIG. 27 is a top view, showing a second position of the knocked-down case, with the guide in the open position.
Figure 28:
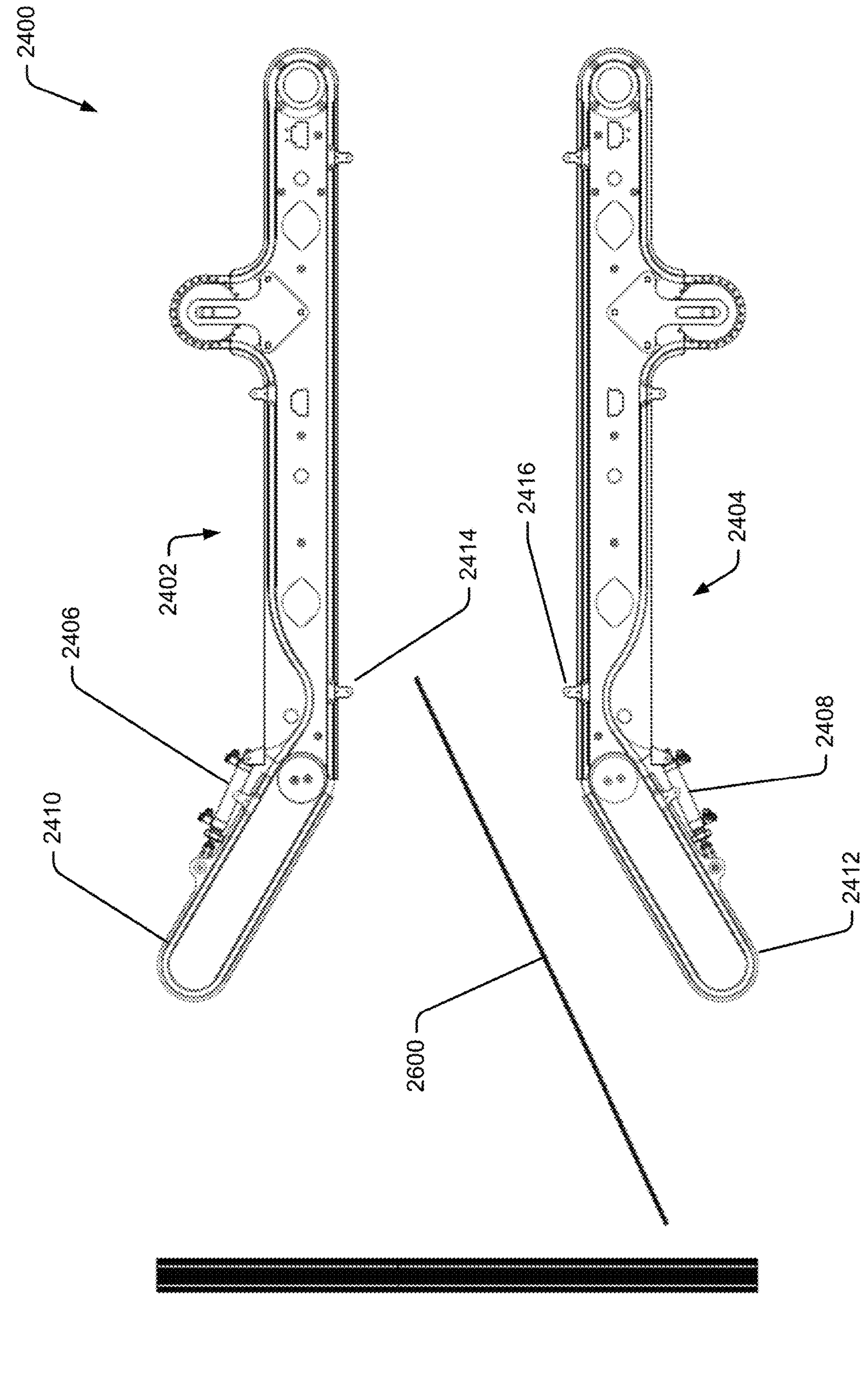
FIG. 28 is a top view, showing a third position of knocked-down case, with the guide in the open position.
Figure 29:
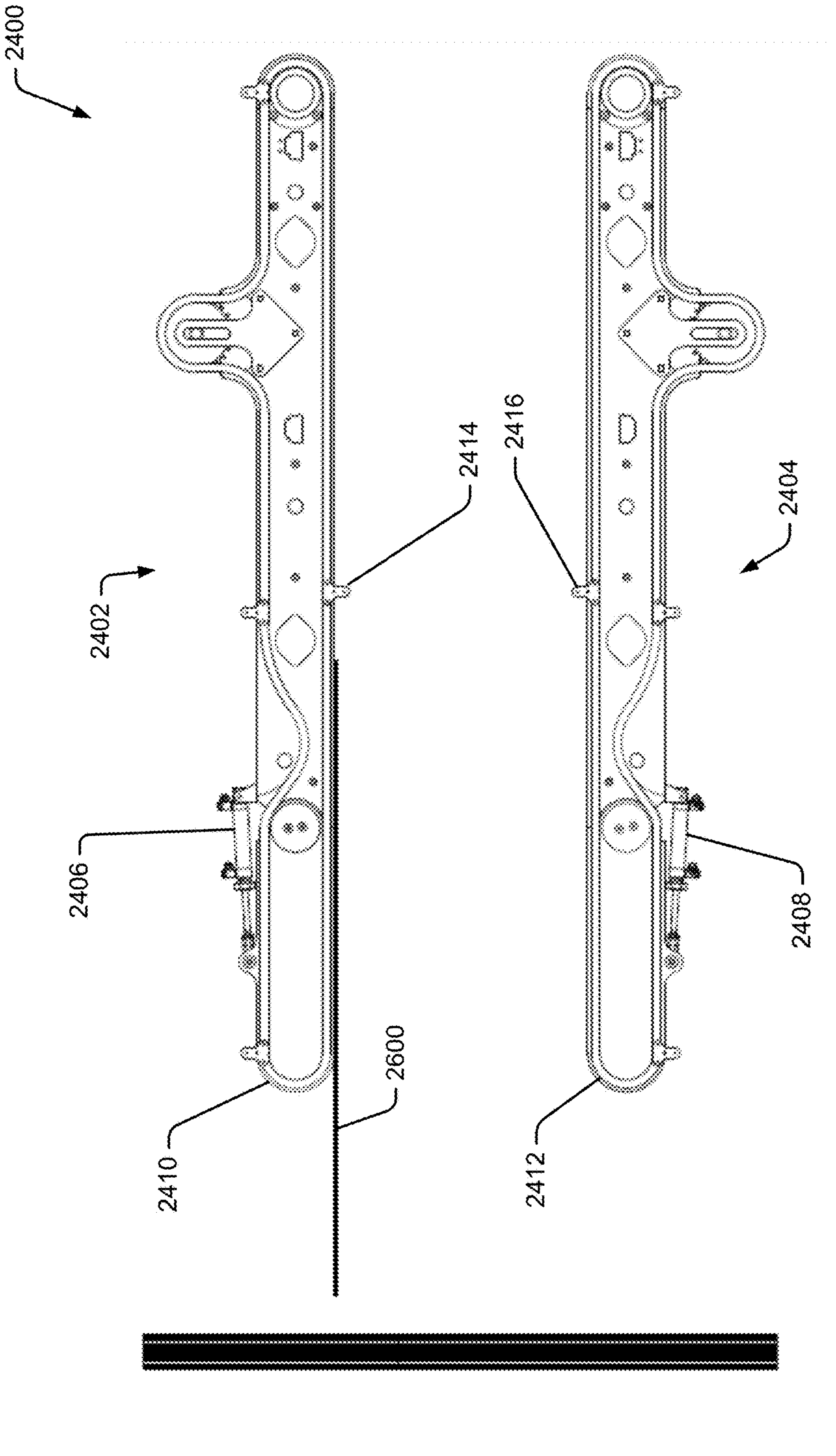
FIG. 29 is a top view, showing a fourth position of the knocked-down case, with the guide a closed position.
Figure 30:
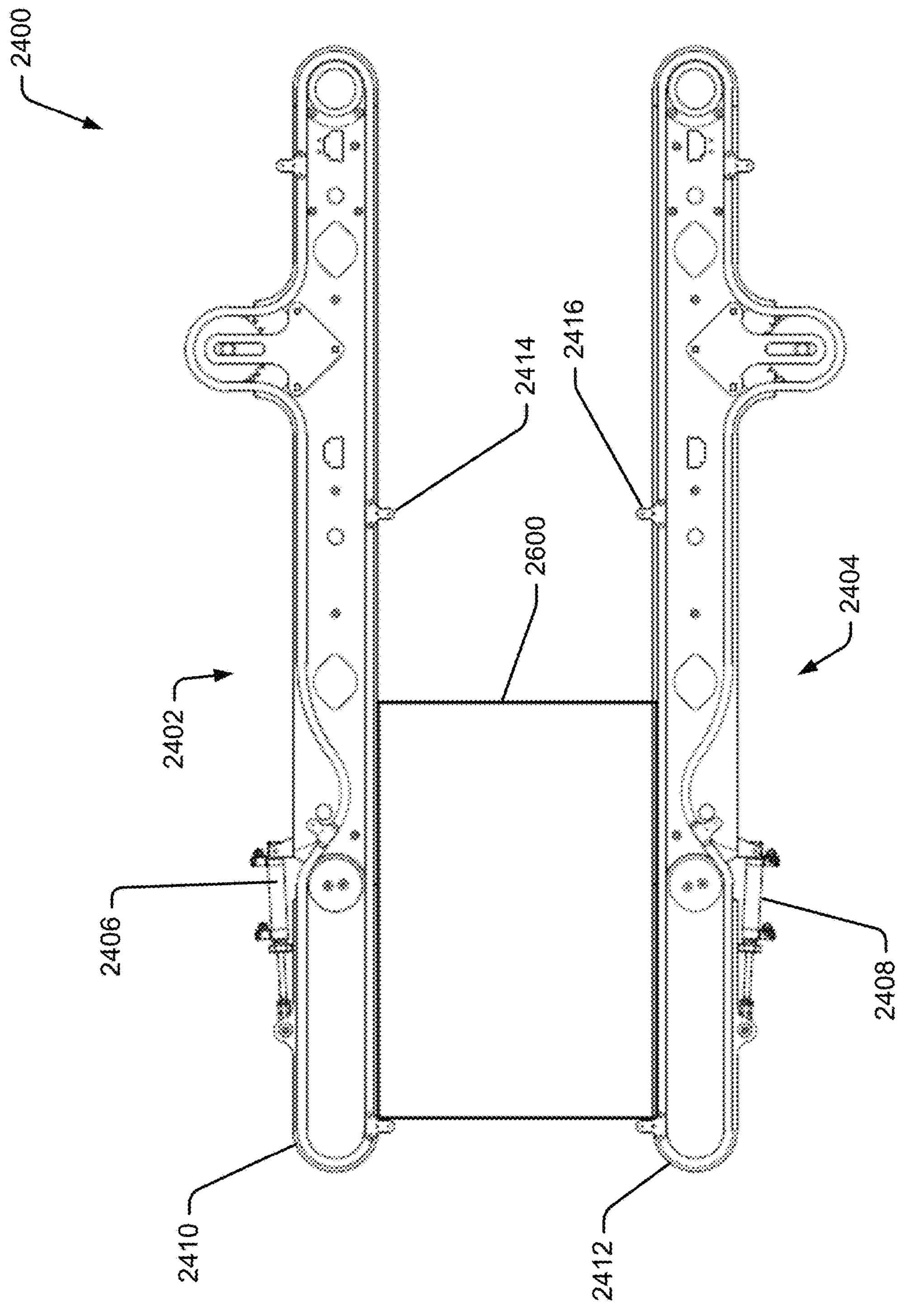
FIG. 30 is a top view showing the case after having been opened, and showing the guide in the closed position.

FIG. 25 shows the chain guides pivoted into an "open" position, to allow additional space between them. FIGS. 26-28 show the case being rotated in the space between the chain guides, such as in FIGS. 3-5 with respect to the first example. FIG. 29 shows the folded-flat case in a horizontal position between the chain guides, which have moved from the "open" position to the "closed" position. FIG. 29 shows the case in a similar position to the case of FIG. 6, immediately prior to erection. FIG. 30 shows the case in the erected configuration, and is therefore similar to FIG. 8.

Accordingly, by configuring the chain guides to pivot, sufficient space is created for the erection of the case (e.g., as seen in FIGS. 1-18) without the expense (in time, floorspace, and machinery) of translating the case vertically or horizontally after erection.

Overview Belt Guides Pivoting to Allow Case-Erection

A fourth example is seen in FIGS. 31-34. In the example, the techniques provide for a system similar to that seen in FIGS. 24-30, except that the chain guides are replaced with belt guides.

Example System and Techniques

FIG. 1 shows a case-erection apparatus or system, e.g., an H-bot assembly 100, configured to move a grasping tool 102 to locations defined by their positions on the X- and Y-axes. Example locations (labeled 102A through 102G) of the grasping tool 102 are shown by the pathway 104. In the example, the grasping tool 102 is configured to pickoff (grasp) a folded-flat case 106, and to then erect the case. In FIG. 1, "left hand" cases are shown. A "folded-flat case," can also be called a regular slotted case (RSC), and is also known as a knock down case. RSC's are typical containers, wherein two top flaps, and two bottom flaps, meet at their respective centers upon sealing of the case. A right-hand folded-flat (knocked-down) case has the major panel on the right, and the minor panel on the left, when the logo or graphics of the major panel are oriented right-side-up. A left-hand folded-flat case has the major panel on the left, and the minor panel on the right, when the graphics are right-side-up.

The grasping tool 102 moves through positions 102A through 102G, thereby moving the case 106 through positions 106A through 106G. In position 102A, the grasping tool 102 grasps the folded-flat case 106 in its then-current location 106A adjacent to other cases in a "cassette," "magazine," or "rack" 124 of cases. In positions, 102B through 102E, the grasping tool 102 moves the folded-flat case through positions 106B through 106E. As the folded-flat case moves and/or rotates through positions 106B to 106D, it moves into the position 106E that is 90-degrees clockwise from its original position at 106A. At position 106E, the case 106 has been moved by the grasping tool 102 into a position that is in contact with a stationary tool 108.

In the example shown, the grasping tool 106 is equipped with suction cups (or suctions cup pairs) 110, 112. Similarly, the stationary tool 108 is equipped with suctions cups (or suctions cup pairs) 114, 116. At location 106A, the grasping tool has grasped two panels of the folded-flat case, i.e., there is a seam, fold, or crease between panels of the case (not shown) between the suction cups 110, 112. When the case is in location 106F, the suction cup 112 has released the minor (smaller) panel of the case, while the suction cup 110 retains its grip on the major panel of the case. Also, at location 106F the case has been partly opened, in that it is no longer in a folded-flat configuration. At location 106G, the case is in the "open" position, with 90-degree angles between all adjacent sides.

The grasping tool 102 is configured for movement in the "north" and "south" directions along a supporting beam 118. The supporting beam is configured for movement in the "east" and "west" directions. In the example shown, a "northern end" of the supporting beam 118 moves along a northern beam 120 of the H-bot, while a "southern end" of the supporting beam 118 moves along a southern beam 122 of the H-bot 102.

FIG. 2 shows the H-bot 100 and grasping tool 102 in a position to pickoff (i.e., to grasp) a case 106 from a rack 124 of cases. The supporting beam 118 (i.e., the beam that supports the grasping tool 102) has moved to the far left on the northern support beam 120 and southern support beam 122 of the H-bot 100. The grasping tool 102 has moved into position in the north-south direction of the supporting beam 118 so that the suction cups 110, 112 properly grasp the case 106. Suction cup(s) 110 of the grasping tool 106 grasp one panel of the case 106, while suction cup(s) 112 grasp an adjacent panel of the case, with a seam 200 of the case between the suction cups 110 and 112. Such a grasp—holding points of two adjacent panels of the case a fixed in-line distance apart—prevents premature opening of the case. The stationary tool 108 is in a position to grasp the case when it is moved into contact with the stationary tool.

Figure 3:
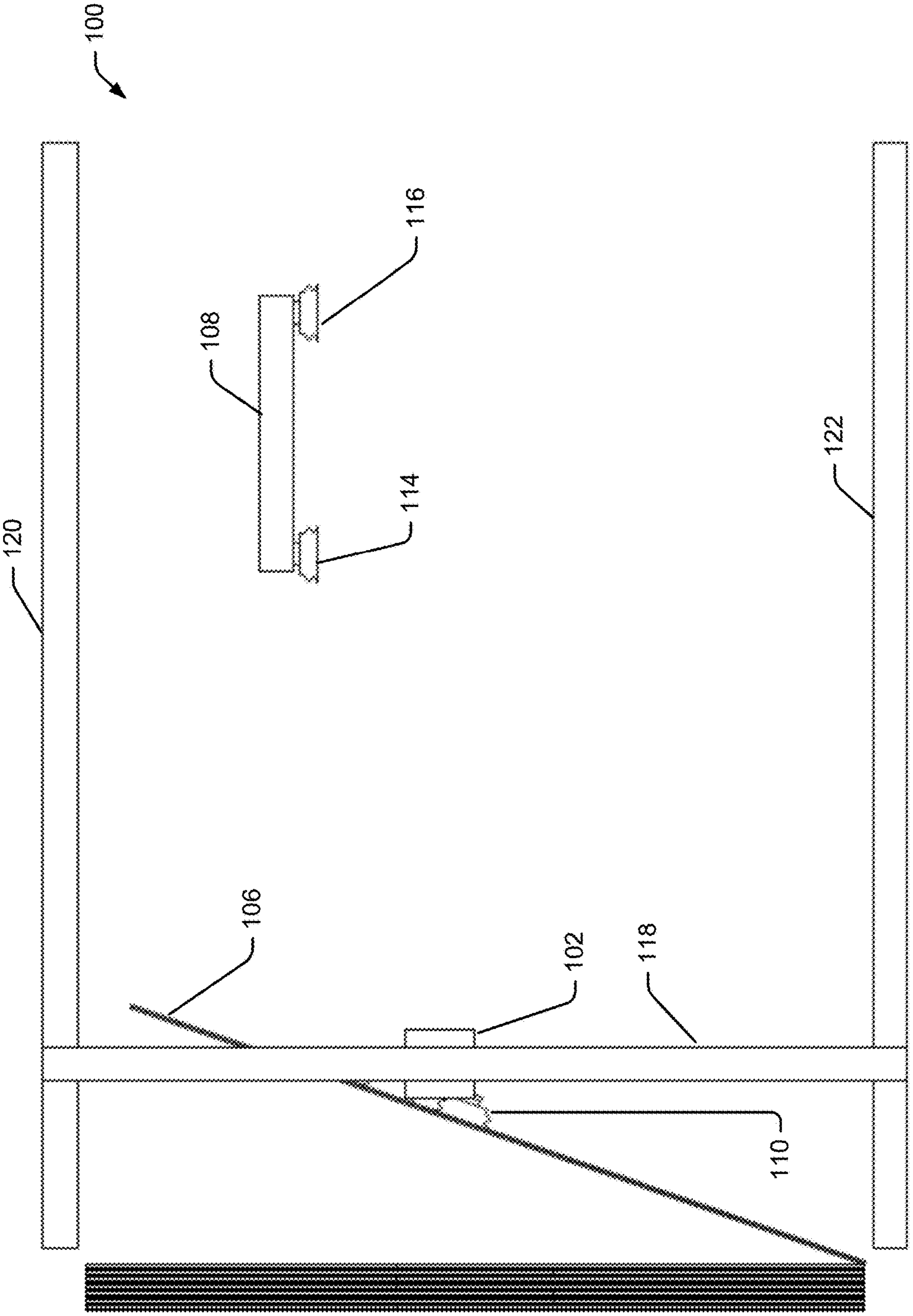
FIG. 3 shows a top view, where the tool has begun to translate and rotate the case.

FIG. 3 shows the H-bot 100 in a state wherein the grasping tool 102 has begun to translate and rotate the case 106. The supporting beam 118 has moved to the right on the northern support beam 120 and the southern support beam 122. The grasping tool 102 has begun to pivot or rotate, to thereby rotate the case 106.

Figure 4:
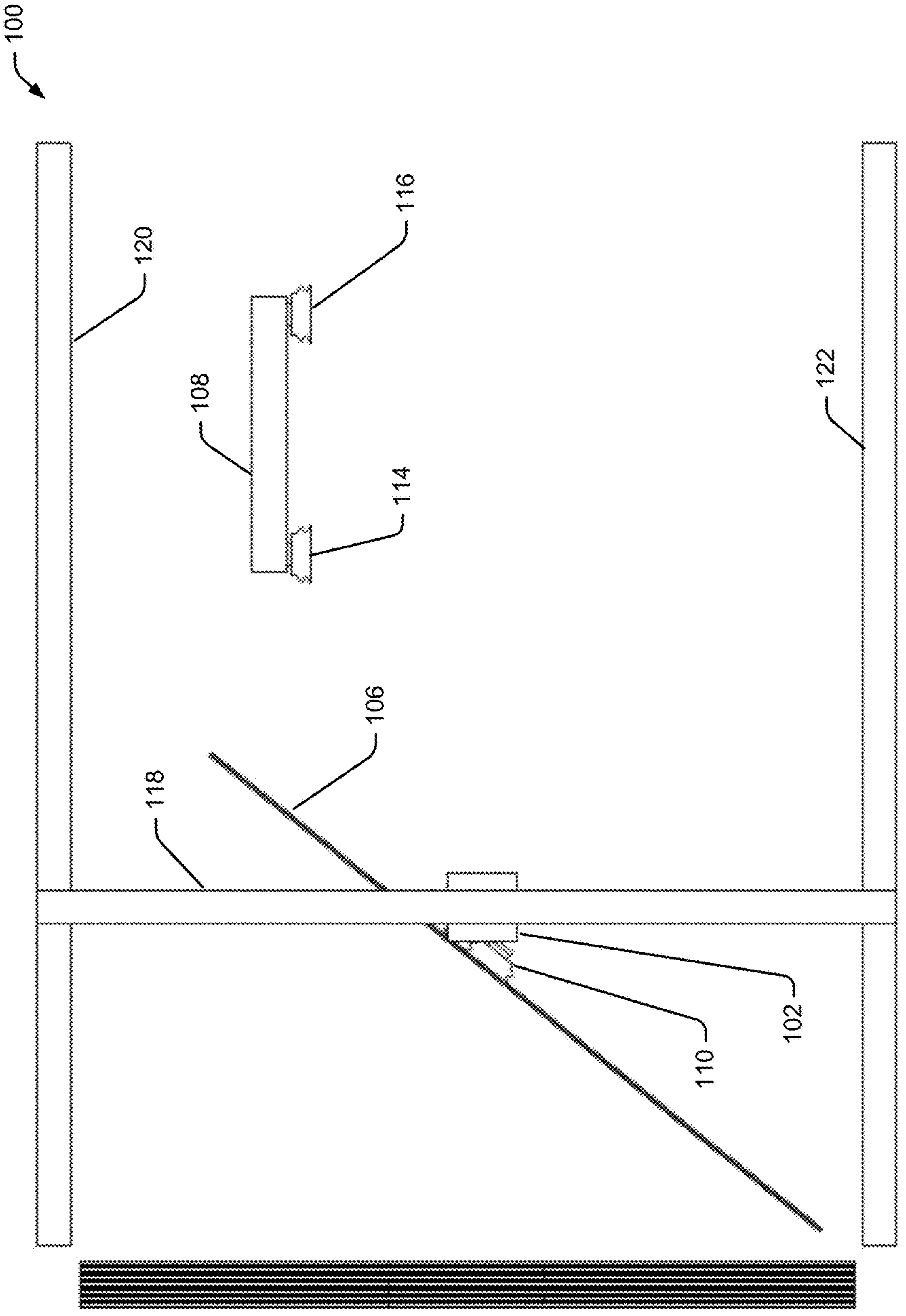
FIG. 4 shows a top view, wherein the tool continues the translation and rotation of the case.

FIG. 4 shows continued left-to-right movement of the supporting beam 118 along its supporting northern beam 118 and southern beam 120. The grasping tool 102 continues to rotate the case.

Figure 5:
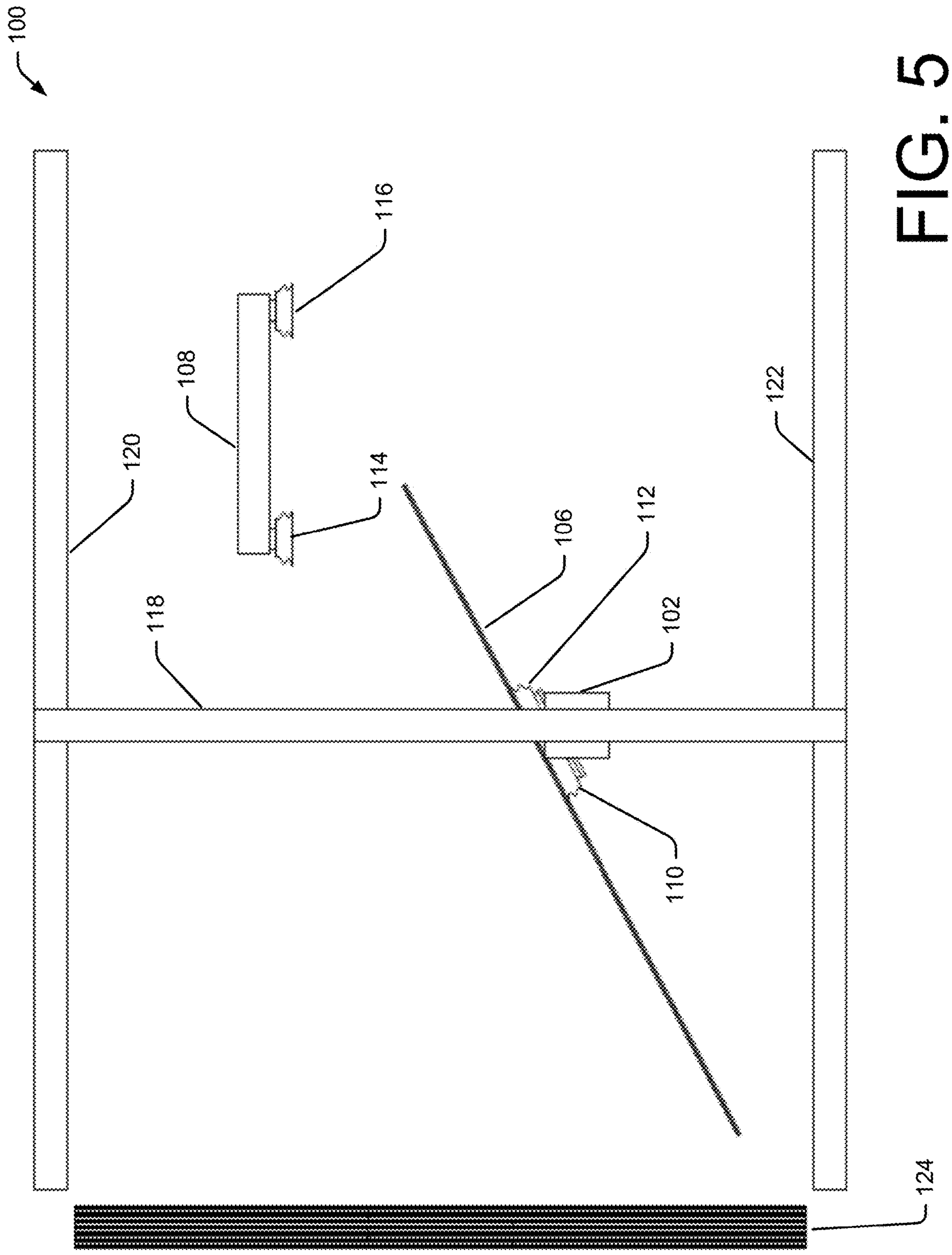
FIG. 5 shows a top view, wherein the tool continues the translation and rotation of the case.

FIG. 5 shows the movements of FIG. 4 continuing, as the grasping tool moves downward (along the supporting beam 118) and to the right (as the supporting beam moves on the northern beam 120 and southern beam 122). The case 106 is approaching 90 degrees of rotation from its original orientation.

FIG. 6 shows the grasping tool 102 having moved upward (in this plan view) and the case has rotated a full 90 degrees. The case is 106 is in contact with stationary tool 108, which has grasped a major panel of the case with its suction cups 114, 116. The case is still in the folded-flat condition, but is located in an initial position for case erection. At this time, suction may be released on the suction cup(s) 112 of the grasping tool 102, which releases the minor panel and allows the seam (between suction cup(s) 110 and suction cup(s) 112) to fold from 180-degrees to 90-degrees during the case-erection process.

FIG. 7 shows the case erection process at a stage wherein it is approximately half erected. The stationary tool 108 grasps one major panel of the case 106, while suction cup(s) 110 of the grasping tool 102 grasp the other major panel of the case. As the grasping tool 102 is moved (in the view shown) downwardly (along the supporting beam 118) and to the right (as the supporting beam moves on the northern beam 120 and the southern beam 122) the case 106 begins to open.

FIG. 8 shows a top view, wherein the stationary tool 108 remains stationary, and movement of the grasping tool 102 has caused the case 106 to fully open.

Figure 9:
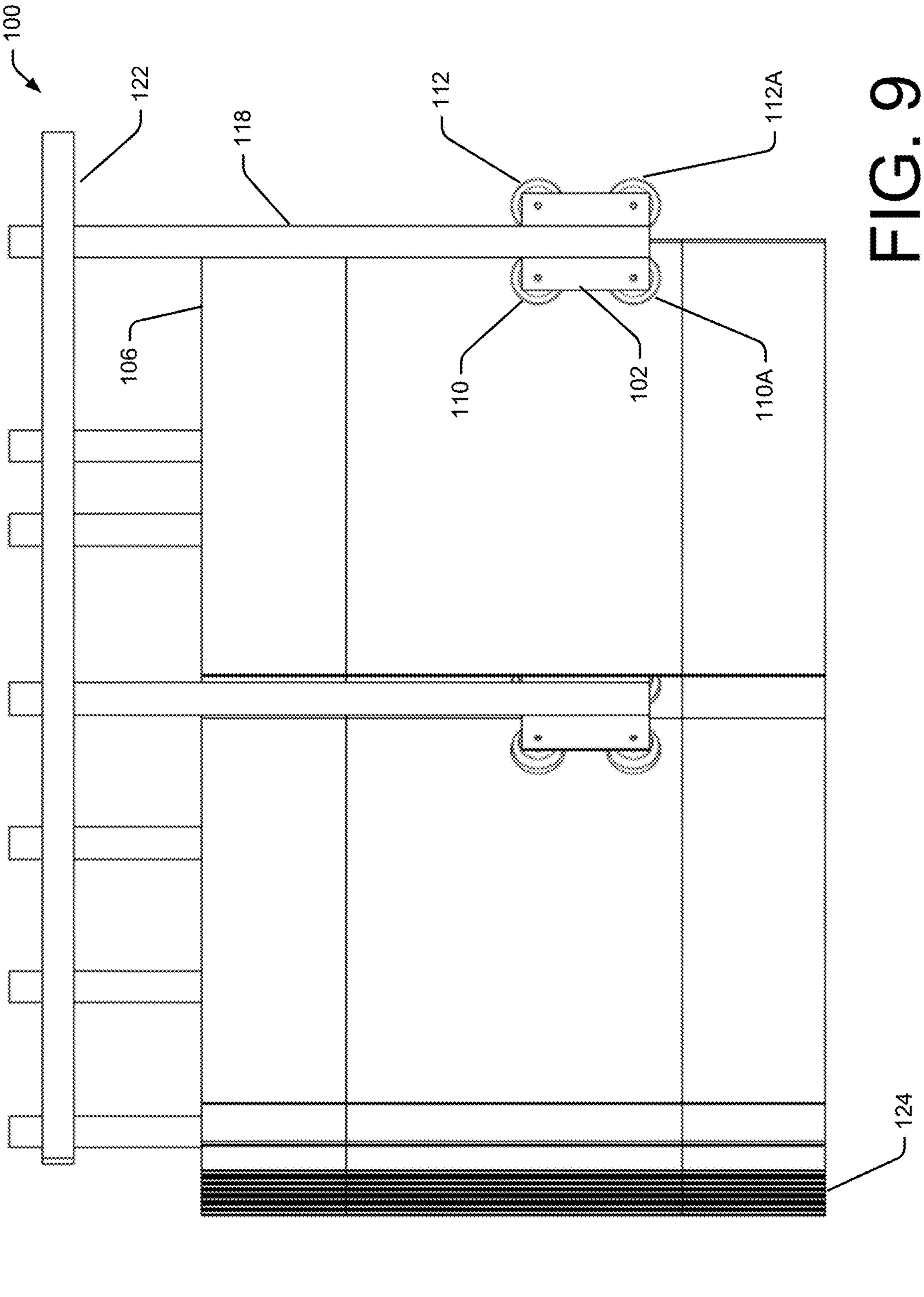
FIG. 9 shows a side view of the H-Bot assembly configured to pickoff and erect cases, and shows the same grasping tool in multiple locations, superimposed in a manner wherein the case obscures the view of the tool in some instances.

FIG. 9 shows a side view of the H-Bot assembly configured to pickoff and erect cases, and shows the same grasping tool in multiple locations, superimposed in a manner wherein the case obscures the view of the tool in some instances. In this view, the grasping tool 102 is configured with suction cups 110, 110A and behind them (and therefore not seen) suction cups 112, 112A.

Figure 10:
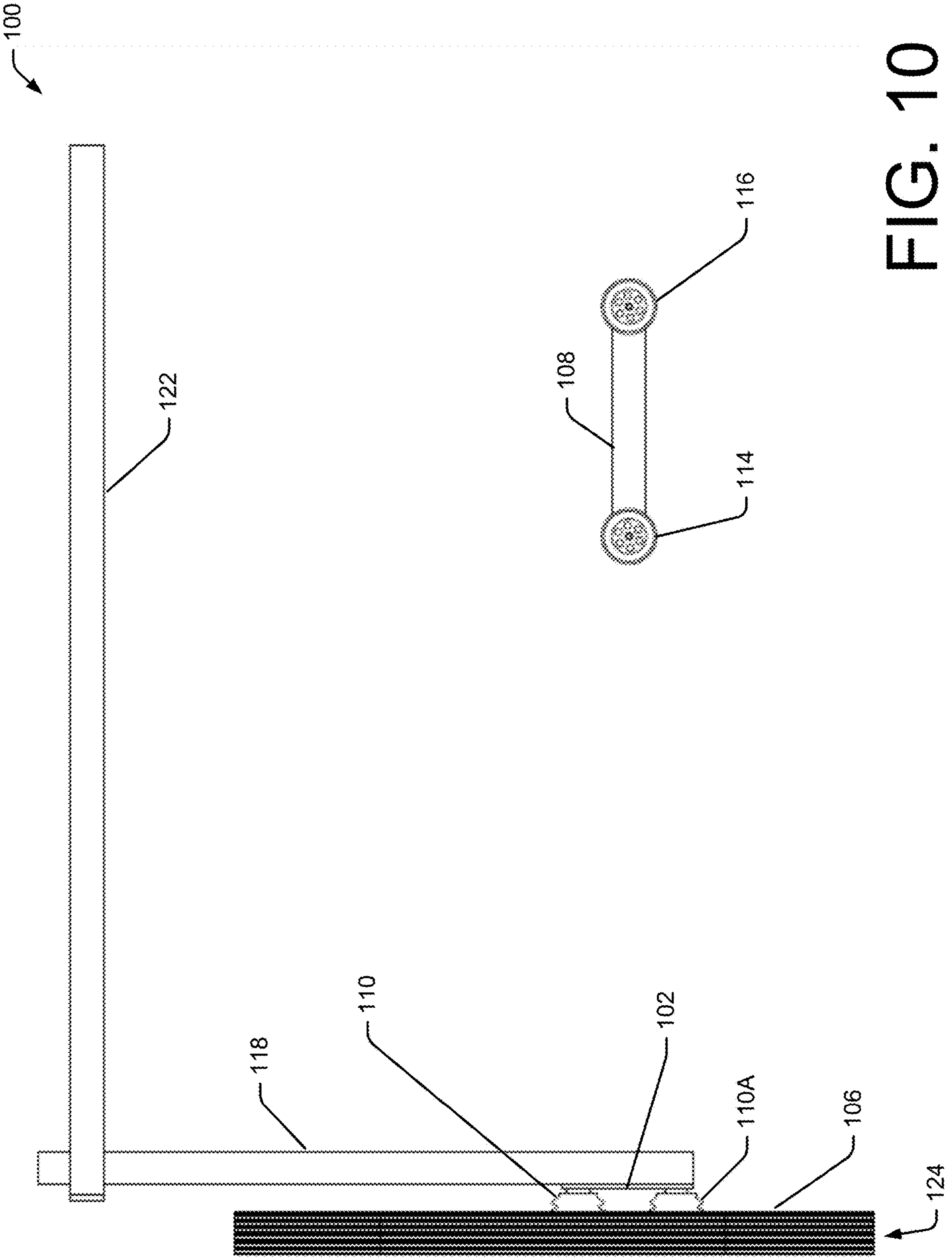
FIG. 10 shows a side view of the tool in a position to pickoff (i.e., grasp) a case, and shows the second tool in a stationary position.

FIG. 10 shows a side view of the grasping tool 102 in a position to "pickoff" (i.e., to grasp) a case 106, and shows the stationary tool in a stationary position. Accordingly, FIG. 10 is a side view of the situation seen in the top view of FIG. 2.

Figure 11:
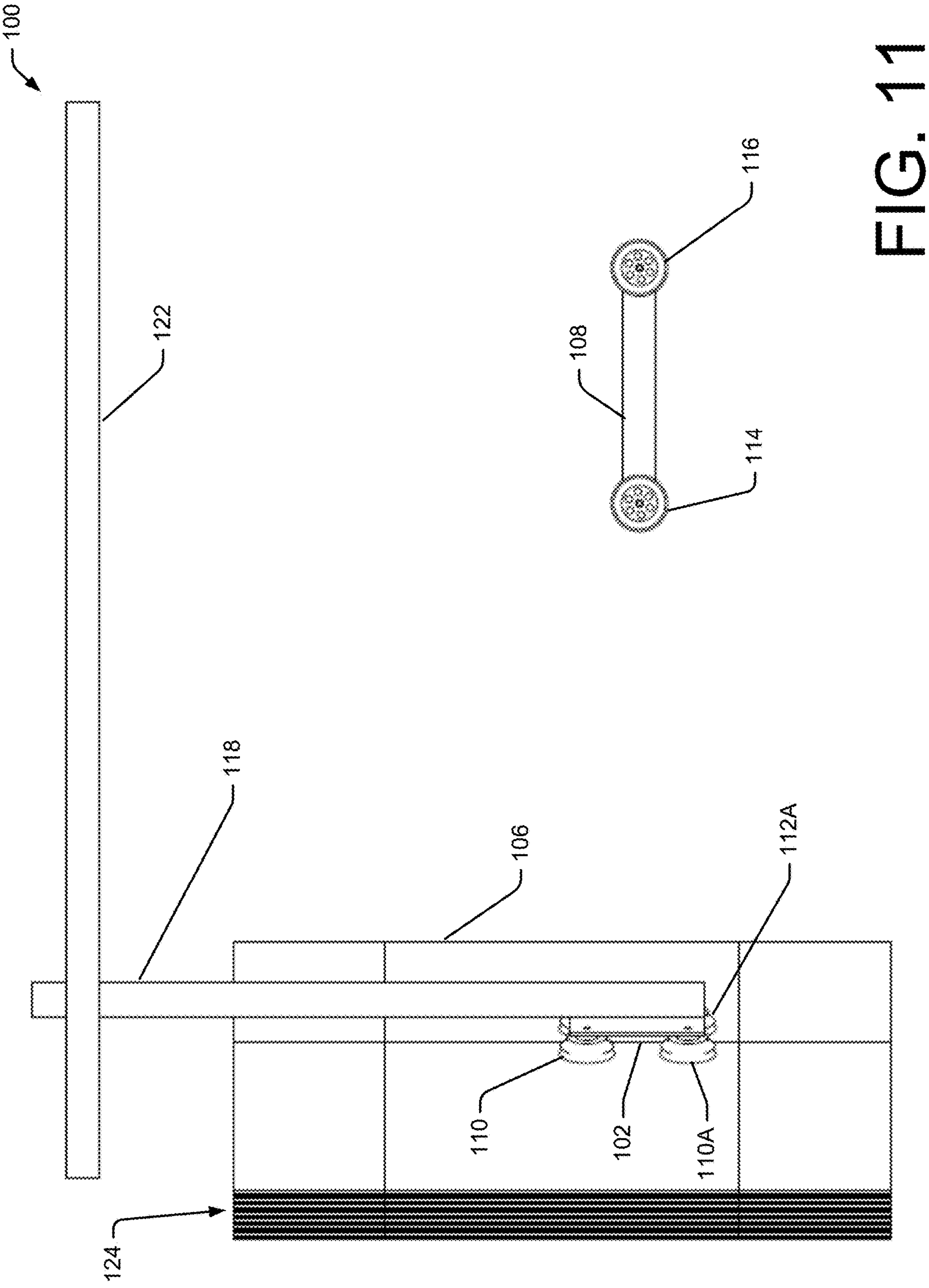
FIG. 11 shows a side view of the tool as it translates and rotates the case.

FIG. 11 shows a side view of the grasping tool 102 as it translates and rotates the case 106. Accordingly, FIG. 11 is a side view of the situation seen in the top view of FIG. 3.

Figure 12:
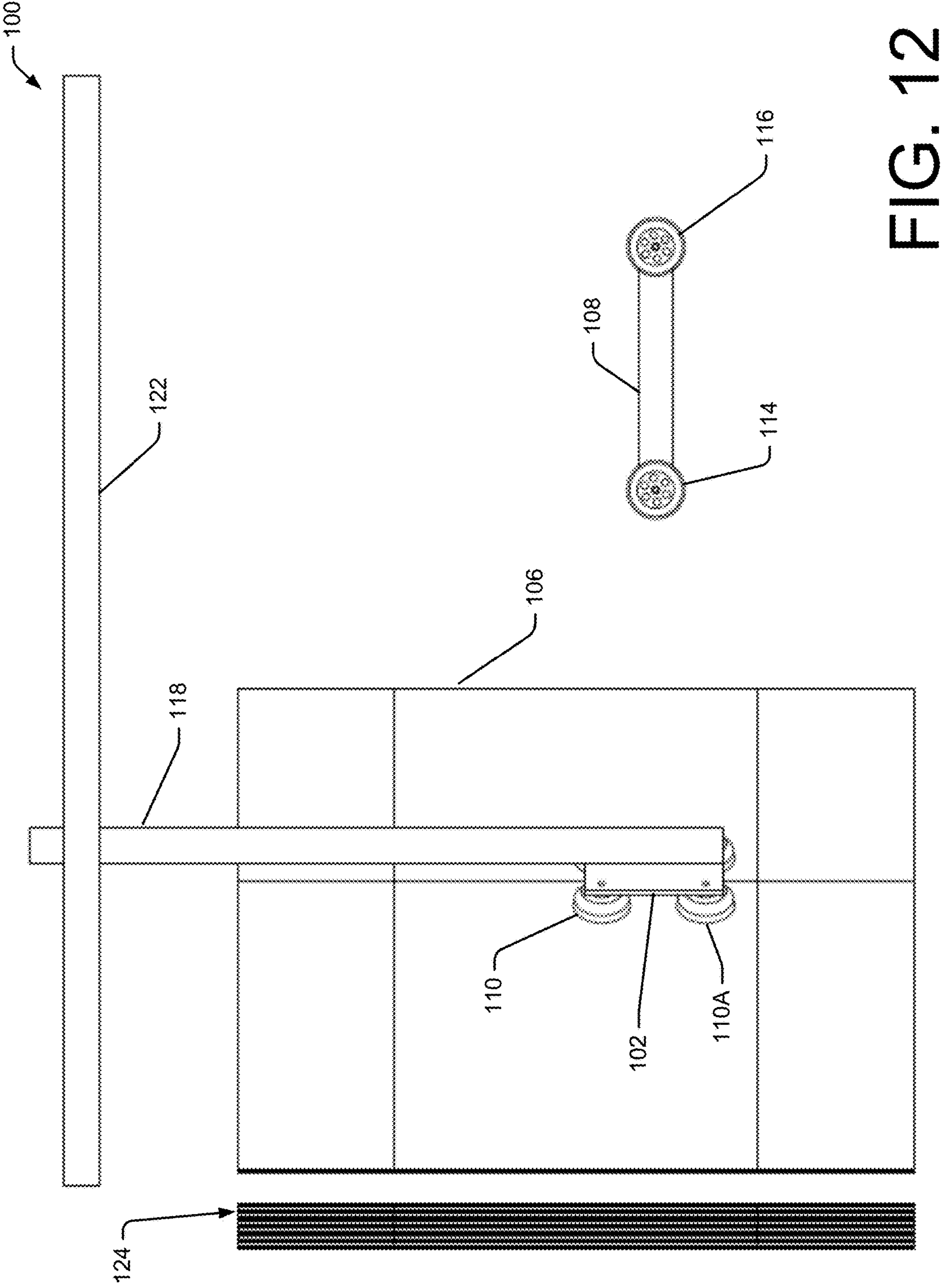
FIG. 12 shows a side view of the tool as it continues to translate and rotate the case.

FIG. 12 shows a side view of the grasping tool 102 as it continues to translate and rotate the case 106. Accordingly, FIG. 12 is a side view of the situation seen in the top view of FIG. 4, with the case 106 in the folded-flat condition.

Figure 13:
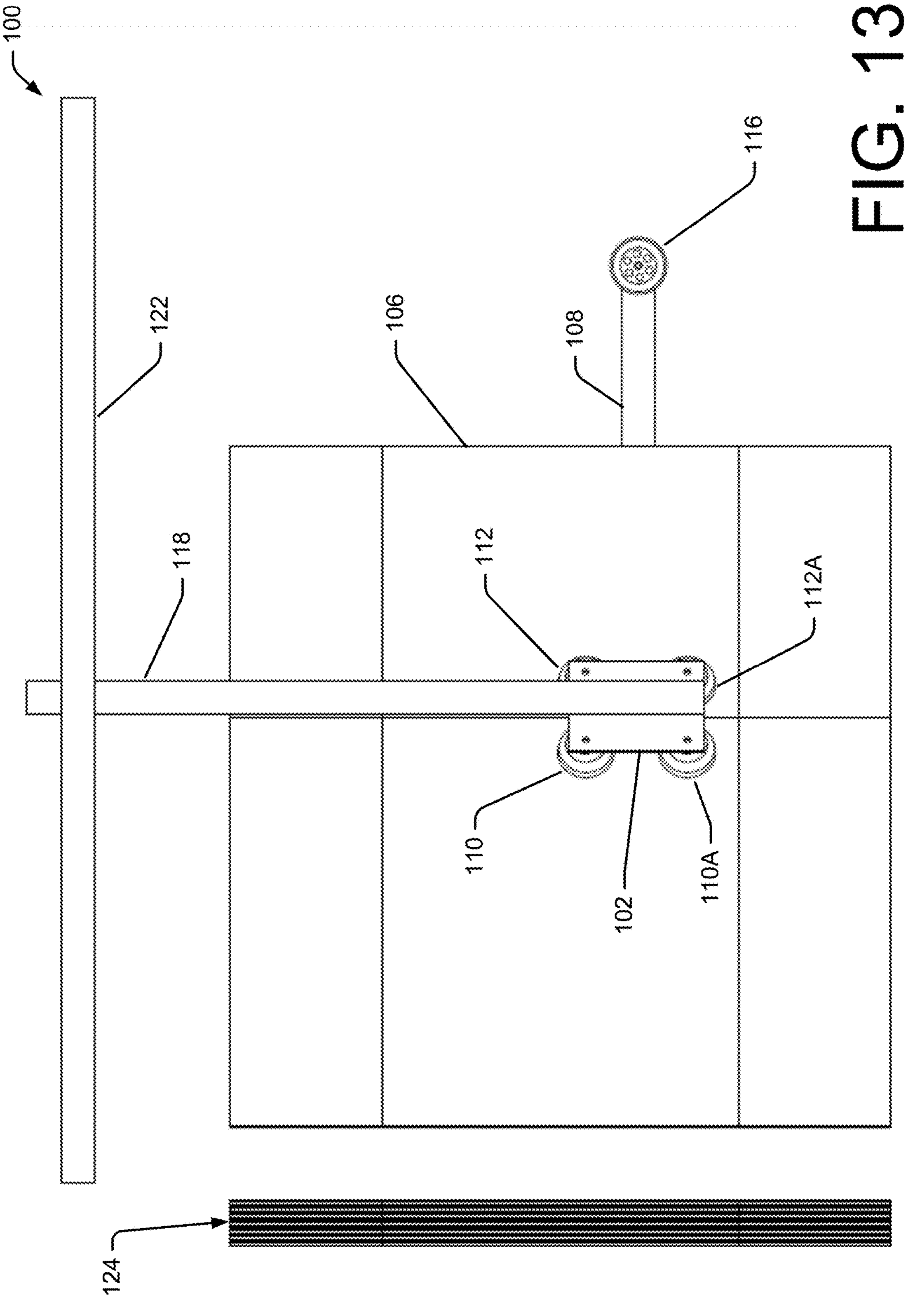
FIG. 13 shows a side view of the tool as it continues translational movement and rotation of the case, and shows that the case has begun to obscure the view of the second tool, and is similar to FIG. 5 in terms of stage of operation.

FIG. 13 shows a side view of the grasping tool 102 as it continues translation and rotate the case 106, and shows that the case has begun top obscure view of the stationary tool. Accordingly, FIG. 13 is a side view of the situation seen in the top view of FIG. 5.

Figure 14:
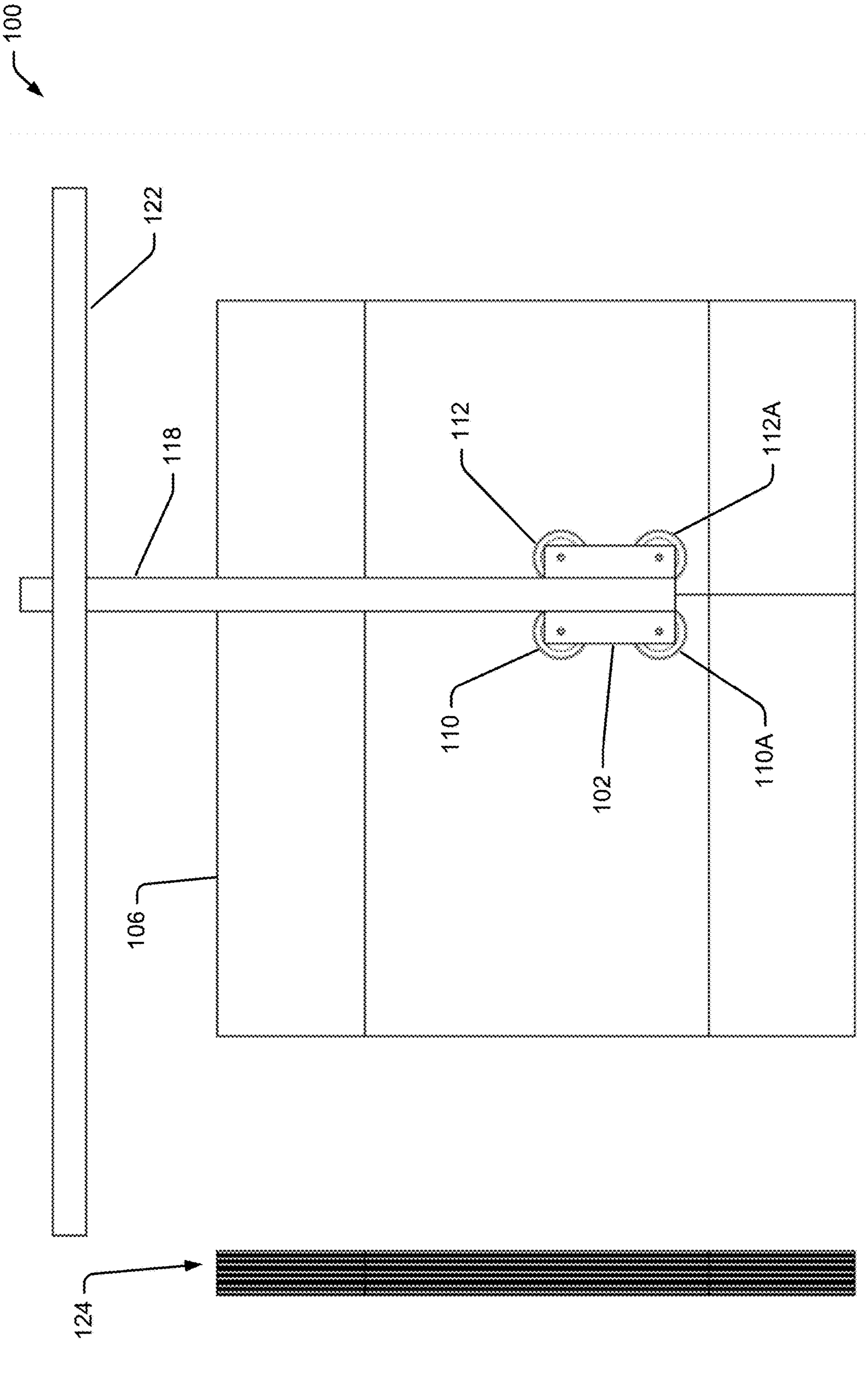
FIG. 14 shows a side view of the tool as the case is placed into initial setup position, in contact with the second tool (no longer visible in this view).

FIG. 14 shows a side view of the grasping tool 102 as the case is placed into initial setup position, in contact with the stationary tool (no longer visible in this view). Accordingly, FIG. 13 is a side view of the situation seen in the top view of FIG. 6.

Figure 15:
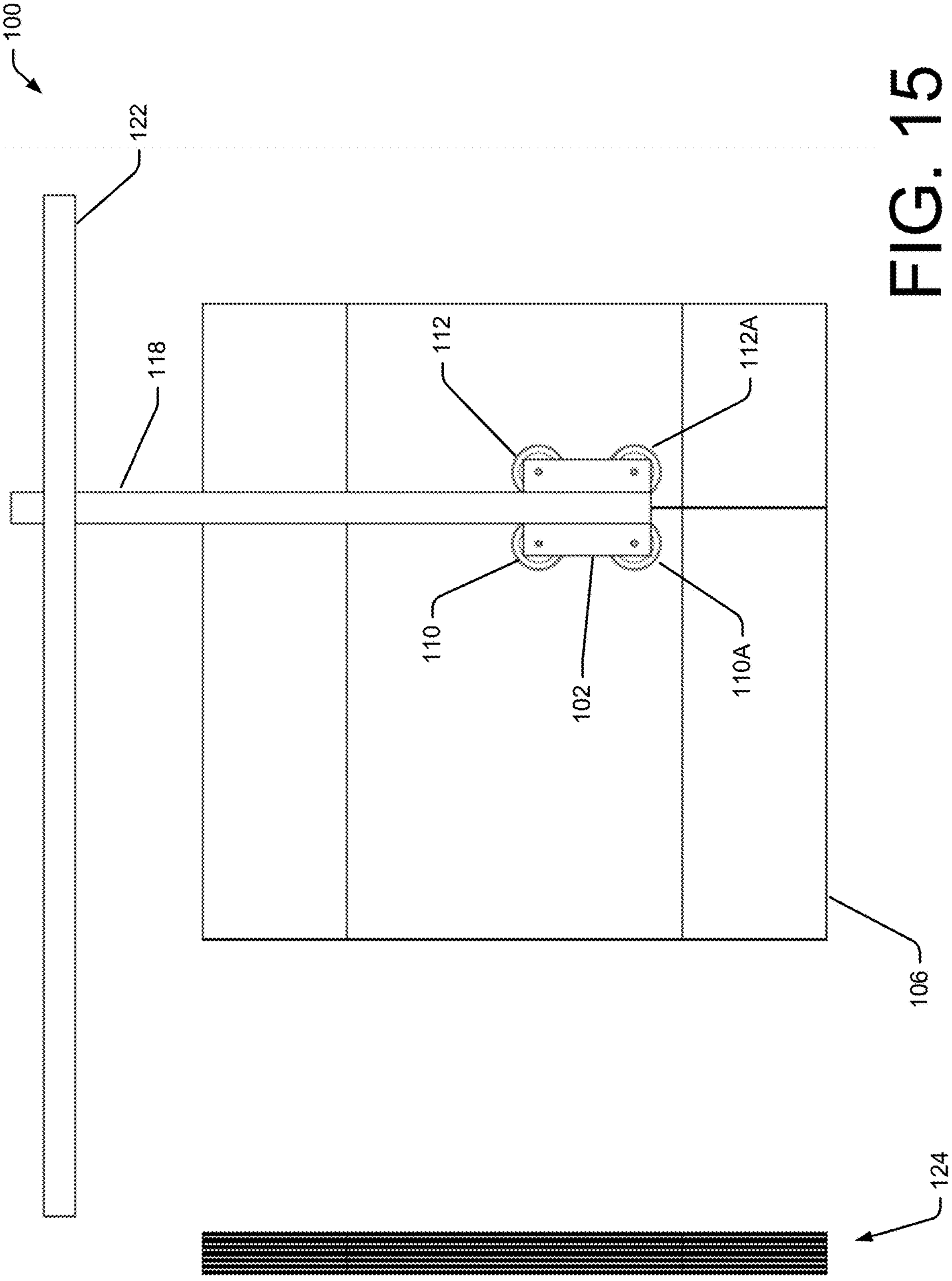
FIG. 15 shows a side view of the tool as it begins to open the case.

FIG. 15 shows a side view of the grasping tool 102 as it begins to open the case 106. Accordingly, FIG. 15 is a side view of the situation seen in the top view of FIG. 7. The suction cups 112, 112A have released the minor flap, thereby allowing the fold to bend. The fold is between the major flap to which the suction cups 110, 110A are attached, and the minor flap to which the suction cups 112, 112A were attached.

Figure 16:
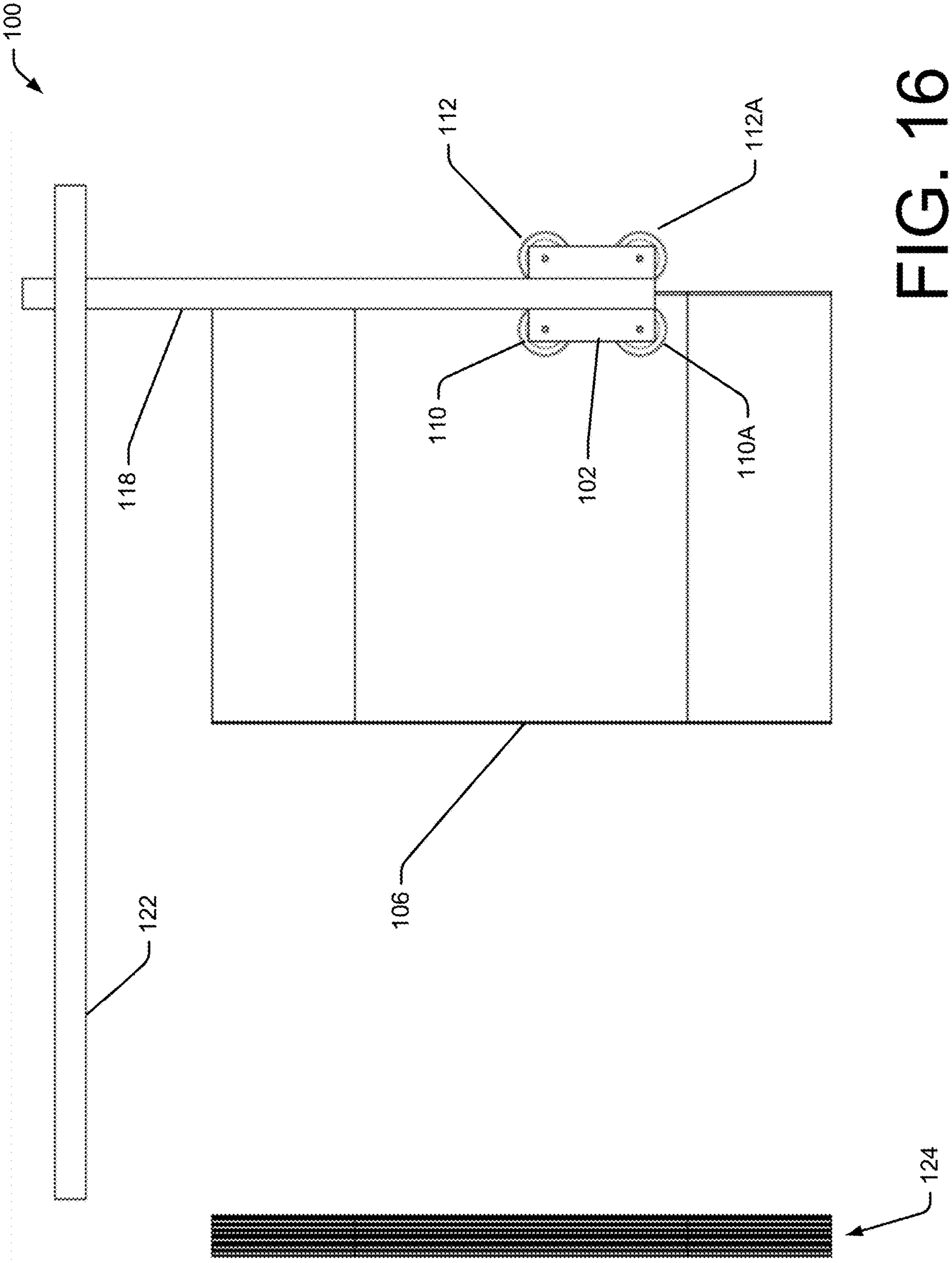
FIG. 16 shows a side view of the tool and the fully open case.

FIG. 16 shows a side view of the grasping tool 102 and the fully open case 106. Accordingly, FIG. 15 is a side view of the situation seen in the top view of FIG. 8.

Figure 17:
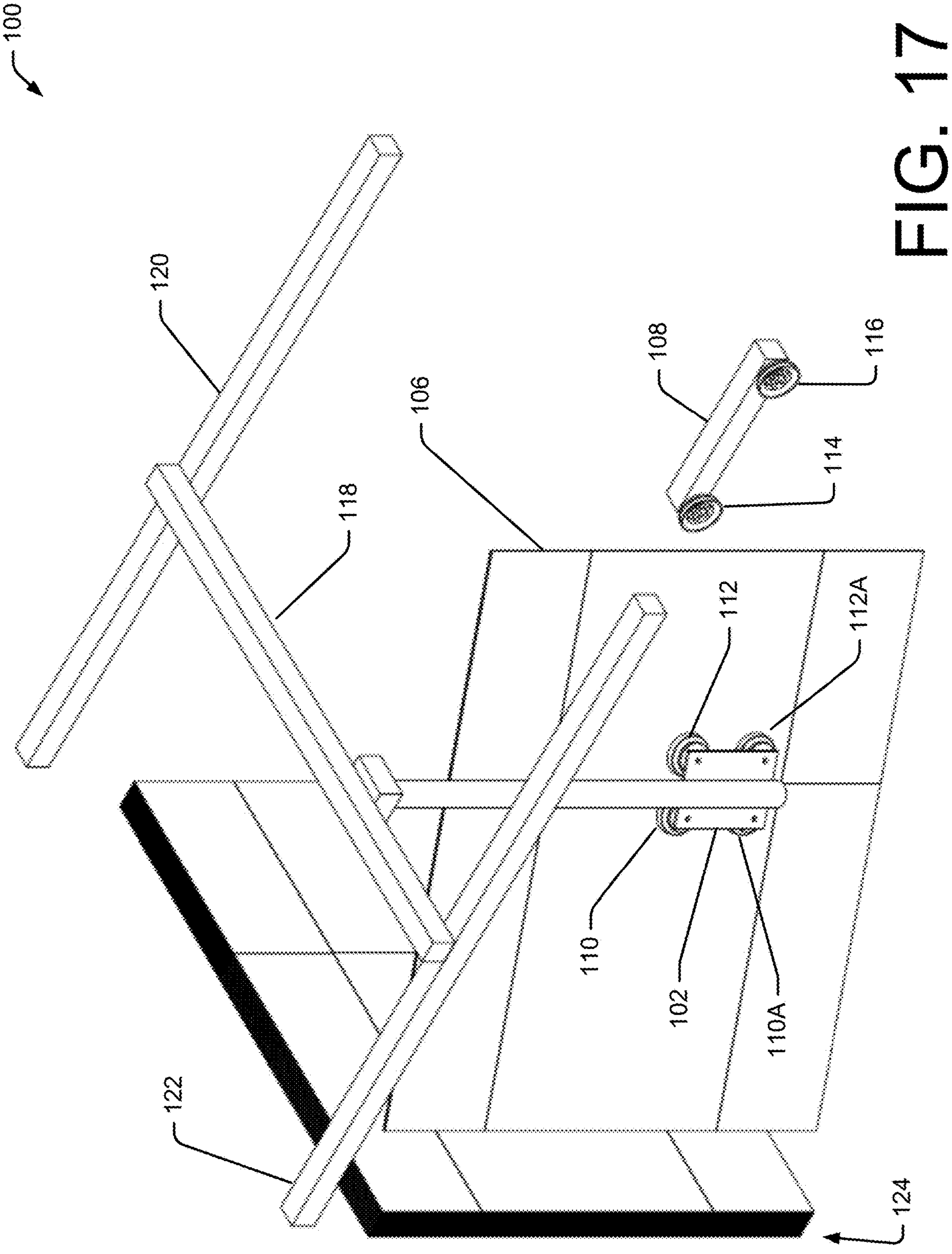
FIG. 17 shows an isometric view showing continued translation and rotation of the case, and is similar to FIGS. 5 and 13 in terms of stage of operation.

FIG. 17 shows an isometric view showing continued translation and rotation of the case, and is similar to FIGS. 5 and 13 in terms of stage of operation.

Figure 18:
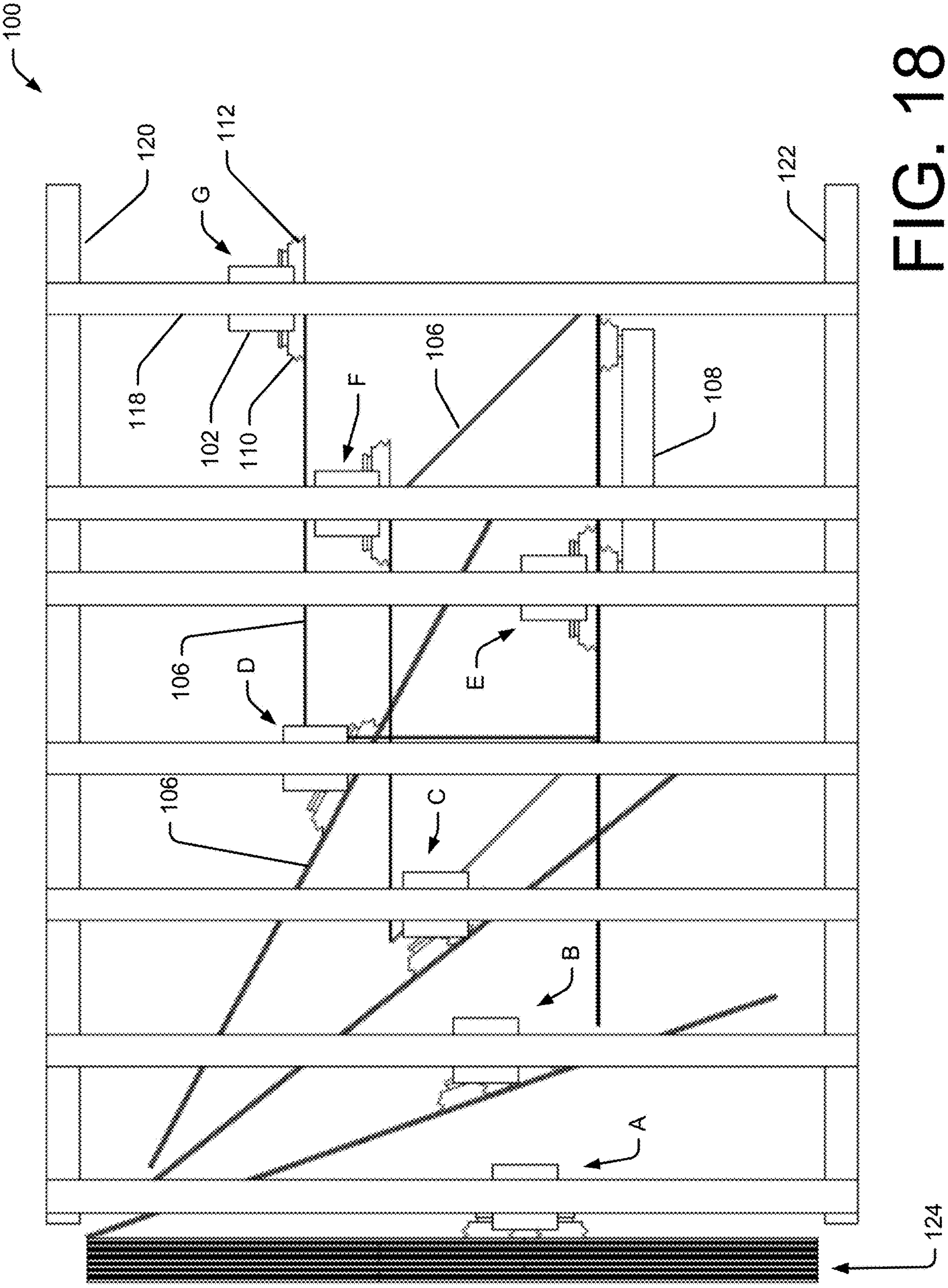
FIG. 18 shows a top view of the H-Bot assembly configured to pickoff and erect righthand (RH) cases, wherein several positions of tool are superimposed.

FIG. 18 shows a top view of the H-bot assembly 100 configured to pickoff and erect right hand (RH) cases. The grasping tool 102 is shown in seven positions, labeled A through G. In the drawing figure: (1) the support beam 118 moves from left-to-right from the first view to the seventh view, itself supported by the northern beam 120 and southern beam 122; (2) the grasping tool 102 moves along the support beam 118, first moving upwardly (in the first four views A-D), then downwardly in the fifth view "E" (to bring the case 106 into contact with the stationary tool 108), and then upwardly (to partially and then fully open the case, in the last two views); (3) the grasping tool rotates counterclockwise 90-degrees over the course of the first five views; and (4) the case is originally folded-flat in the cassette or magazine (in the first view), rotating (in the next three views), still folded-flat but in contact with the stationary tool in the fifth view, partially opened in the sixth view (F), and fully opened in the seventh view (G). Note that the programming of the movement of the grasping tool 102 is based on a number of factors, such as size of the folded-flat case, and the need to avoid contact with the belt- or chain-drive that will propel the erected and partly sealed case on a conveyor assembly.

Example System and Techniques

FIG. 19 shows an H-bot system 1900 and four views of a grasping tool 1902 as it rotates clockwise approximately 135 degrees, moves from the left to the right, and moves downwardly. The example motions illustrate rotation and also movement through the X-Y plane defined by the H-bot system. In the example, the northern beam 120 and southern beam 122 support a supporting beam 118 in a manner that allows east-west translation of the supporting beam. The supporting beam 118 supports the rotatable grasping tool 1902 at pivot 1916, and allows it to move north and south along the supporting beam by operation of a motor (not shown for clarity). Accordingly, the pivot 1916 may be moved to any desired location, e.g., along path 1918. The pin 1906 of the rotation arm 1904, sliding in the slot or track 1910 of the rotation-control beam 1908 moves along path 1920.

A rotation arm 1904 is attached to the grasping tool 1902. In an example, a first end of the rotation arm 1904 may be attached to the grasping tool 1902. By moving the second end of the rotation arm 1904, the angle of orientation of the grasping tool may be controlled. In an example of how the second end may be moved, a pin 1906 in a second end of the rotation arm 1904 may slide in a slot or track 1910 defined in a lengthwise direction in a rotation-control beam 1908. The rotation-control beam 1908 may oriented to move in north-south directions or east-west directions, depending on design constraints or preferences. In the example shown, the east/west orientated rotation-control beam moves north and/or south under control of a belt or chain drive 1912 and motor 1914. By moving in the north/south direction, the pin 1906 will slide in the slot or track 1910 and cause the grasping tool 1902 to rotate.

Figure 20:
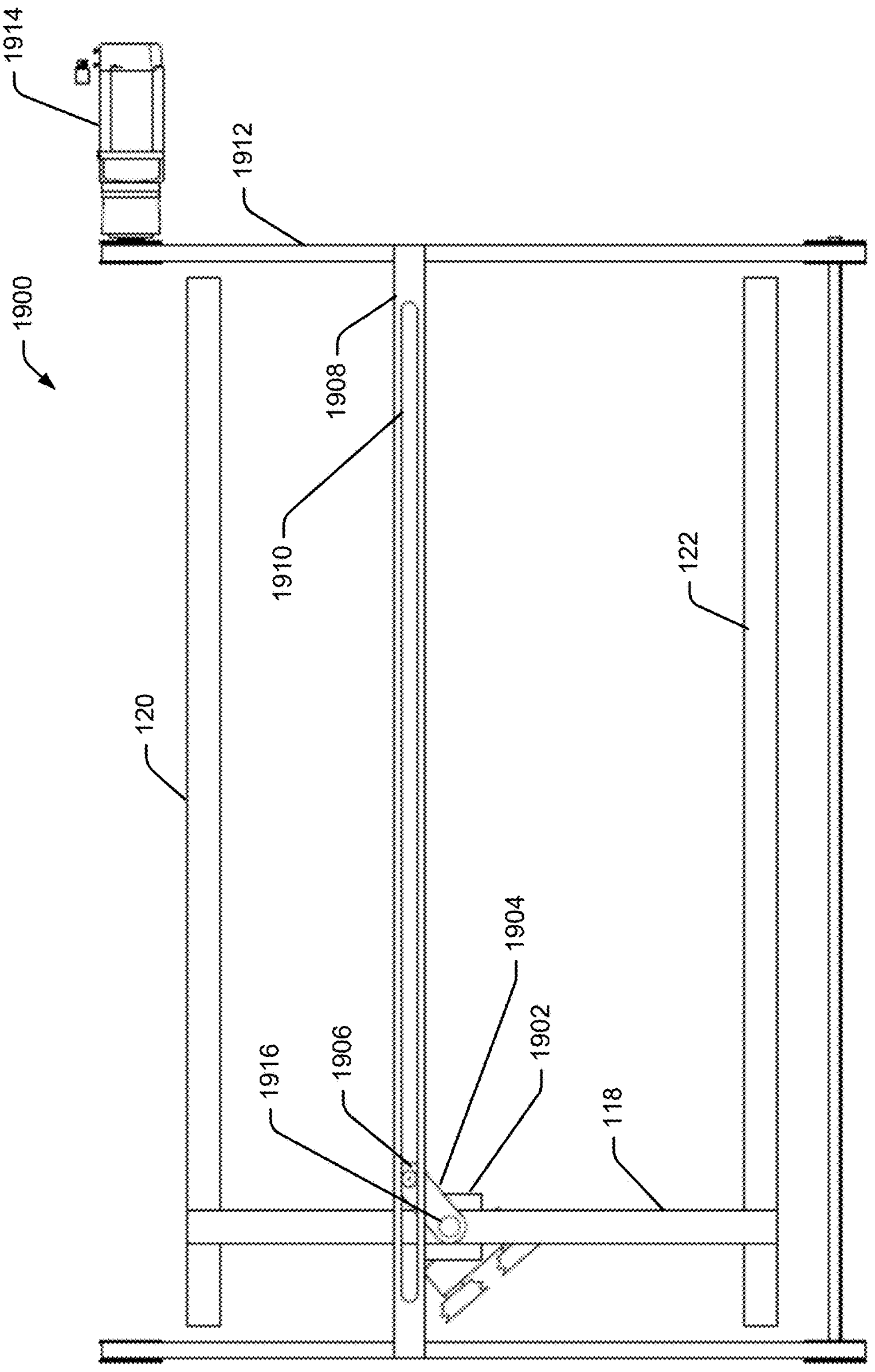
FIG. 20 shows a top view in a first position, with the suction cups pointed to the lower left.

FIG. 20 shows a top view of the H-bot system 1900. The east-west position of the supporting beam 118 is controlled, for example, by a belt drive and associated motor (not shown for drawing clarity). The north-south position of the grasping tool (which slides along the supporting beam 118) may be controlled by an additional belt drive and associated motor (not shown for drawing clarity). The north-south position of the rotation-control beam 1908 is controlled by the belt drive 1912 (or chain drive, etc.) and motor 1914. In the example shown, the pin 1906 traveling in the slot or track 1910 orients the grasping tool 1902 in the position shown, with the suction cups of the grasping tool pointed to the lower left. If the rotation-control beam 1908 moves slightly upward, then the pin 1906 will move in the slot 1910, moving the rotation arm 1904 to rotate the grasping tool slightly in the counterclockwise direction. Conversely, if the rotation-control beam 1908 moves slightly downward, then the grasping tool will rotate slightly in the clockwise direction.

Figure 21:
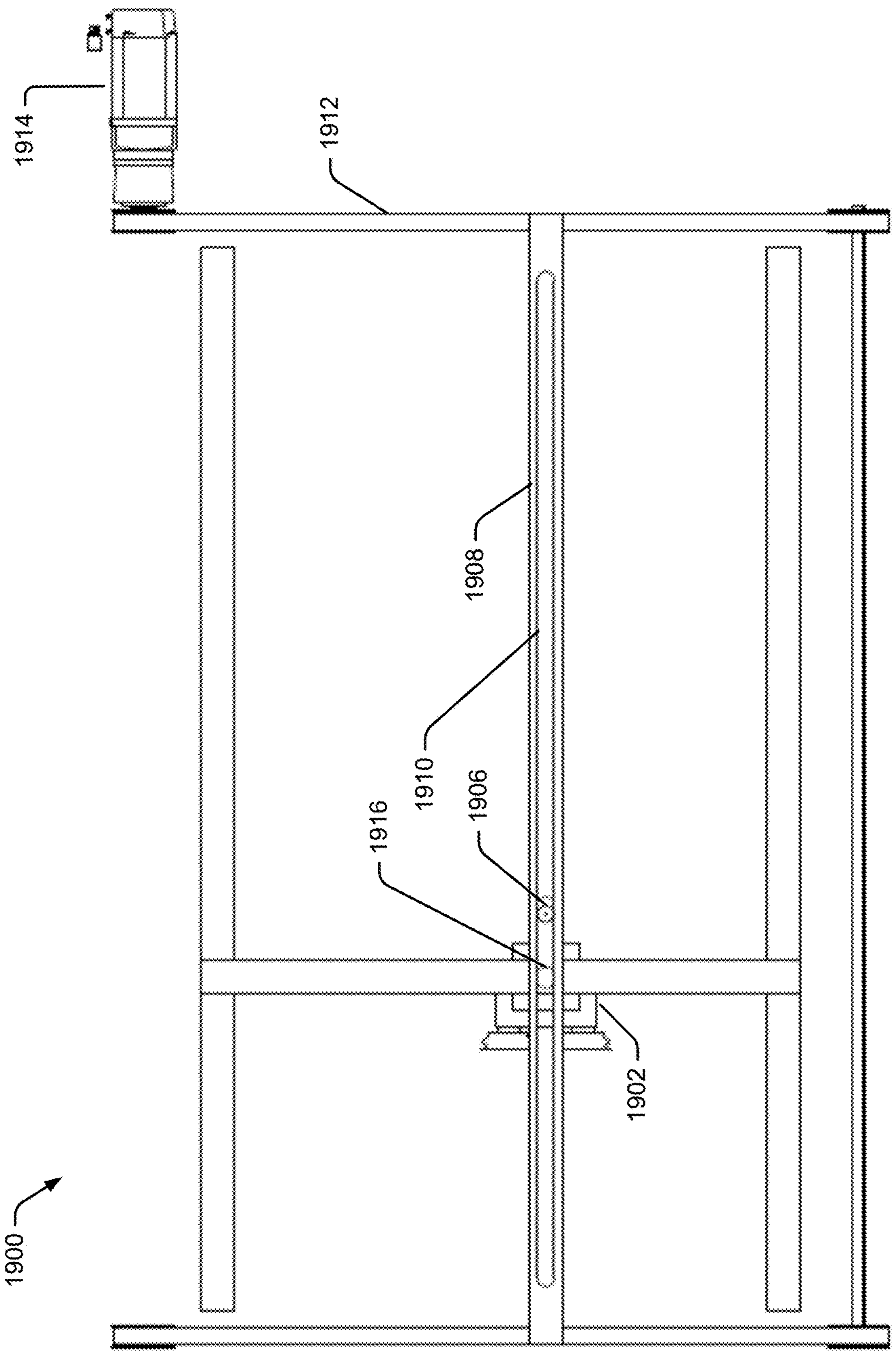
FIG. 21 shows a top view in a second position, with the suction cups pointed to the left.
Figure 22:
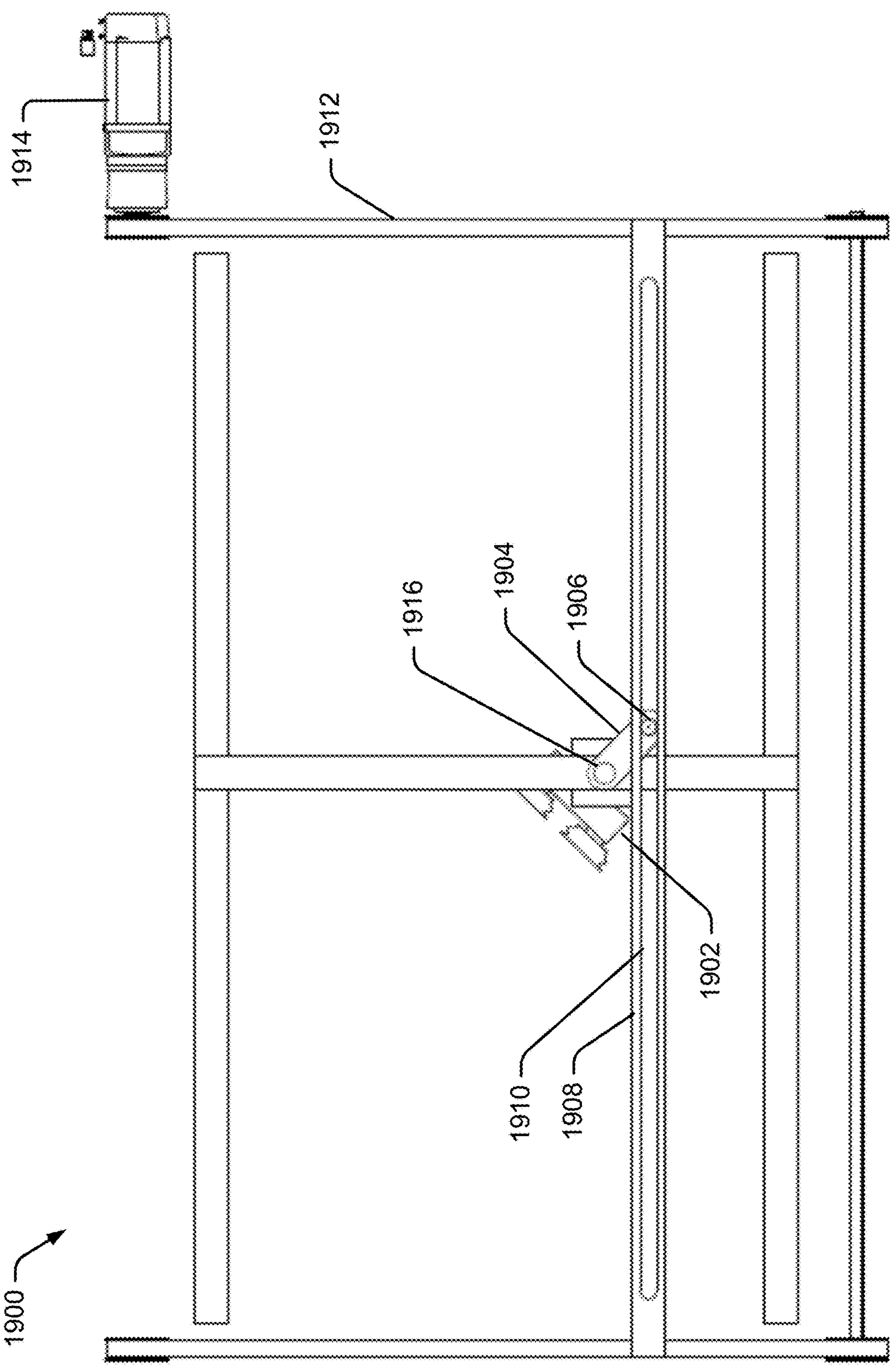
FIG. 22 shows a top view in a third position, with the suction cups pointed to the upper left.
Figure 23:
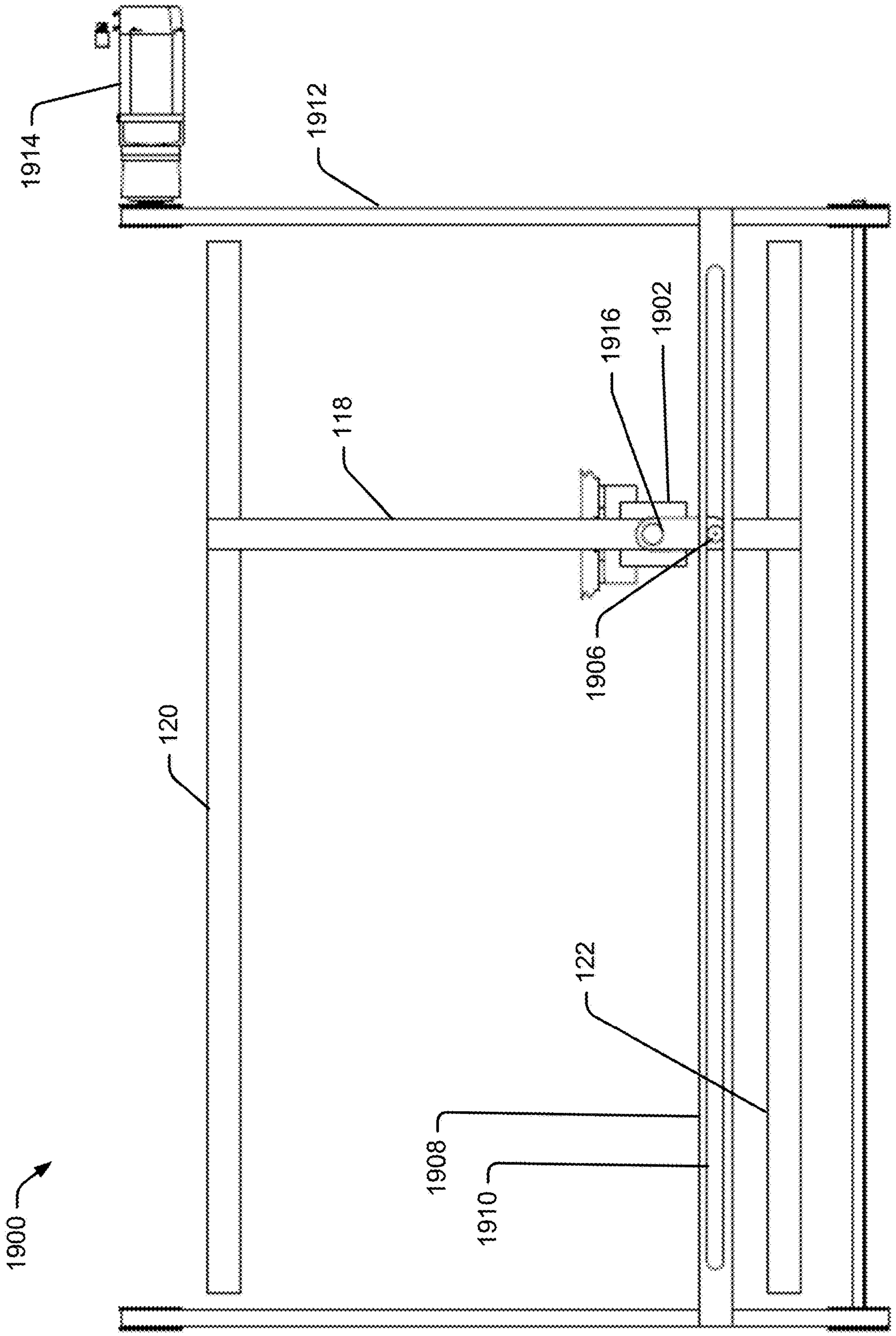
FIG. 23 shows a top view in a fourth position, with the suction cups pointed forward.

FIG. 21 shows a top view of the grasping tool 1902 in a second position, with the suction cups pointed to the left. FIG. 22 shows a top view of the grasping tool 1902 in a third position, with the suction cups pointed to the upper left. FIG. 23 shows a top view of the grasping tool 1902 in a fourth position, with the suction cups pointed forward.

Accordingly, by moving the grasping tool north-and-south on the supporting beam 118 (e.g., by drive belt and motor, not shown), and by moving the supporting beam east-and-west on the northern beam 120 and southern beam 122 (e.g., by drive belt and motor, not shown), the location of the grasping tool may be controlled. Additionally, by moving the rotation-control beam 1908 the angle of orientation (i.e., the rotation) of the grasping tool 1902 may be controlled. The control is provided, for example, by the pin 1906 moving in the slot 1910 of the rotation-control beam 1908 as that beam is moved to thereby move the rotation arm 1904 and rotate the grasping tool.

In some examples, movement of the grasping tool 1902 in either the north or south direction will be accompanied by movement of the rotation-control beam 1904 in the same direction and by the same magnitude if the orientation of the grasping tool is to remain constant. In other examples, the grasping tool may be moved in a non-linear manner while the angle of orientation of the grasping tool is changed.

Example System and Techniques

FIG. 24 shows a pivoting chain guide (or chain drive) system 2400. In the example, left and right pivoting chain guides 2402, 2404 are shown in the open position. The "open" or "angled" position is shown by the pivoting chain guide system 2400 of FIGS. 24 through 28. FIGS. 29 and 30 show the pivoting chain guide system 2400 in the "closed" or "straightened" position. The open position provides space between the chain guides to erect a case. The closed position locates the left and right chain guides in contact with left and right sides of a conveyor assembly, respectively. Contact with the chain guides propels an erected case between them, e.g., to move the case on a conveyor assembly or track.

In the example of FIG. 24, left and right actuators 2406, 2408 have moved respective left and right pivoting end portions 2410, 2412 of respective left and right pivoting chain guides 2402, 2404 into the "open" position.

Several flight lugs (e.g., flight lugs 2414, 2416) on each pivoting chain guide push erected cases along a conveyor assembly. In an example, the flight lugs may be attached to a chain, which moves on or within a track formed by an ultra-high molecular weight polymer.

A rack 124 of folded-flat cases is available to a grasping tool (shown in earlier figures, but not shown here for reasons of drawing clarity). One by one, the cases (e.g., in a folded-flat configuration) may be grasped by the grasping tool, and erected into a box-like configuration. In an example, at least part of the case-erection process may be performed in the space between the chain guides in the "open" configuration of FIGS. 24 through 28. Upon erection and assembly into an open case, the chain guides reconfigure into the closed position and move the erected case to further stations, such as for lower flap taping/sealing, case loading with product, and upper flap taping/sealing.

FIG. 25 shows a top view of the pivoting chain guide system 2400 with pivoting chain guides 2402, 2404 configured in the "open" position to allow space to erect a case. A folded-flat case has not yet been "picked" by a grasping tool (not shown). Accordingly, FIG. 25 shows a view that is similar in timing to the view of FIG. 2.

As seen in FIGS. 26 through 28, the folded-flat case 2600 is moving and rotating within an area between the left and right pivoting end portions 2410, 2412. Accordingly, FIGS. 26-28 show views that is similar in timing to the views of FIGS. 3-5.

FIG. 26 is a top view, showing a first position of a knocked down case 2600 with respect to the pivoting chain guide system 2400, including left and right chain guides 2402, 2404 in the open position. The folded-flat case 2600 has been grasped and is moving toward the left and right pivoting end portions 2410, 2412. The case may have been grasped by the grasping tool 102 (not shown) of FIGS. 1-18 and/or FIGS. 19-23. FIGS. 26-30 will assume that the folded-flat case 2600 is moved by, and then erected by, mechanical means not shown for drawing clarity, but which may be the mechanical means shown in FIGS. 1-23.

FIGS. 27 and 28 show continued movement of the case (shown in an edge-on perspective, from above).

FIG. 29 shows the knocked-down case 2600 prior to erection, and is therefore similar in timing to the view of FIG. 6. In the view of FIG. 29, the pivoting chain guide system 2400 is in the closed position, i.e., the left and right pivoting end portions 2410, 2412 are in a closed position. The left and right pivoting end portions are moved into the closed position by the left and right actuators 2406, 2408.

FIG. 30 is a top view showing the case 2600 after having been opened, and is similar in timing to the view of FIG. 8 and showing the guide in the closed position. As seen in FIG. 30 flight lugs 2414, 2416 are in position to drive the erected case.

Example System and Techniques

Figure 31:
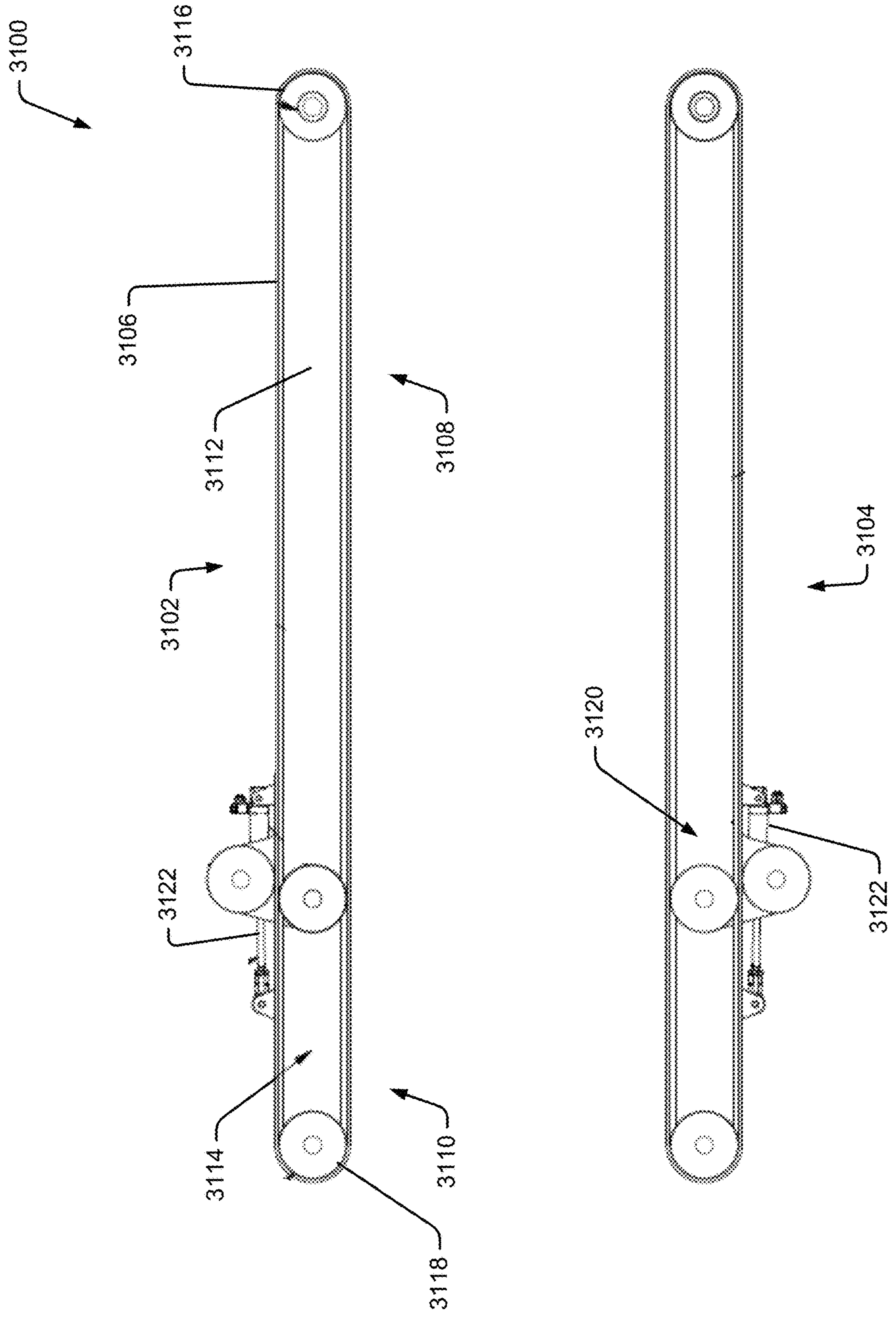
FIG. 31 is a top view of a pivoting belt guide system, with a pair of pivoting side belt guides configured to convey an erected case, showing the belt guides in a closed position.

FIG. 31 shows a pivoting side belt guide system 3100. The pivoting side belt guide system 3100 is an alternative to the pivoting chain guide system 2400 of FIGS. 24-30. The pivoting side belt guide system 3100 includes left and right pivoting belt guides 3102, 3104. The pivoting side belt guides are configured to frictionally engage, "guide," and propel opposed "sides" (e.g., case panels) of an erected case as it moves about a path, such as a conveyor assembly using rollers to support the bottom of the case. The belt guides 3102, 3104 are separated by approximately the width of a case, and the belt 3106 of each belt guide 3102, 3104 makes frictional contact with respective opposed sides of the case, thereby moving the case through a conveyor assembly.

The pivoting side belt guide system 3100 is translatable (e.g., by a pivoting motion) between "open" and "closed" configurations. On each belt guide 3102, 3104, a fixed guide portion 3108 is held in a fixed position, while a pivoting guide portion 3110 moves between the open and closed configurations.

In the view of FIG. 31, the pivoting guide portion 3110 of each belt guide portion 3102, 3104 is in a "closed" or "parallel" configuration. In a manner similar to the pivoting chain guide system 2400, the closed configuration is suitable for conveying an erected and at least partially taped or sealed case. In contrast, the 'open' configuration provides space between the belt guides 3102, 3104 for the erection of the case.

Each belt guide 3102, 3104 may include a fixed frame portion 3112 and a movable or pivoting frame portion 3114. The frame portions support rollers, which in turn support the belt 3106. The pivoting frame portion 3114 is movable between the open and closed configurations. A pivoting end roller 3118 is supported by the pivoting frame 3114, and is part of the pivoting guide portion 3110. A fixed end roller 3116 is part of the fixed guide portion 3108. In an example, the fixed end roller 3116 may function as a drive roller. In that example, an electric motor may be used to turn the fixed end roller in the appropriate direction, speed, timing, etc.

A pivoting roller pair 3120 of each belt guide 3102, 3104 holds the belt 3106 in place when the pivoting belt guide system 3100 is in the open or closed configurations.

An actuator 3122 of each belt guide 3102, 3104 moves the pivoting guide portion 3110 between the open and closed configurations. In a first example, compressed air and a cylinder may be used to power the actuator. In a second example, a solenoid may be used.

Figure 32:
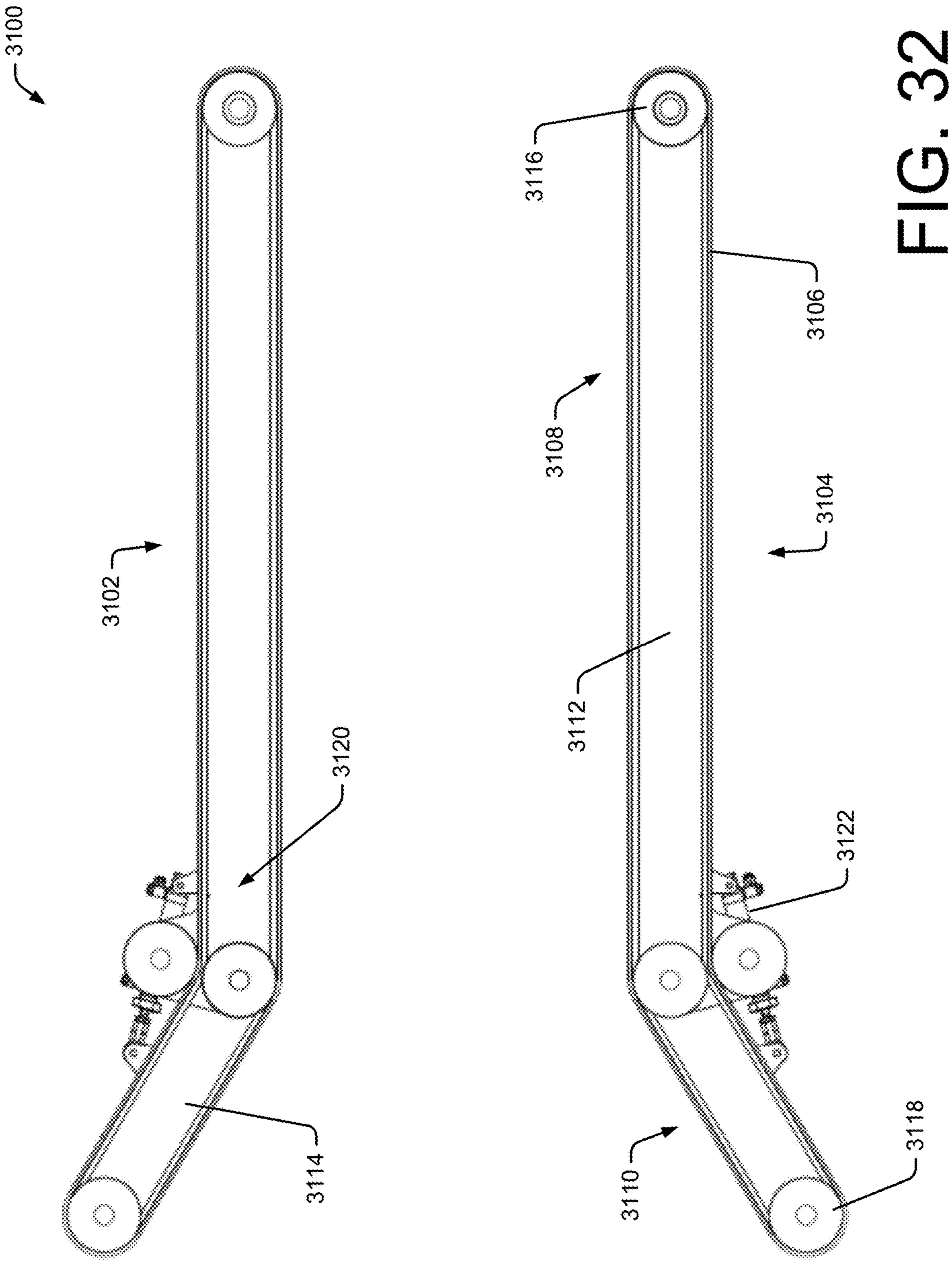
FIG. 32 is a top view of the pivoting side belt guide system, with the belt guides in an open position.

FIG. 32 is a top view of the pivoting side belt guides 3102, 3104, showing their pivoting guide portion 3110 of each side belt guide pivoted into an open position.

Figure 33:
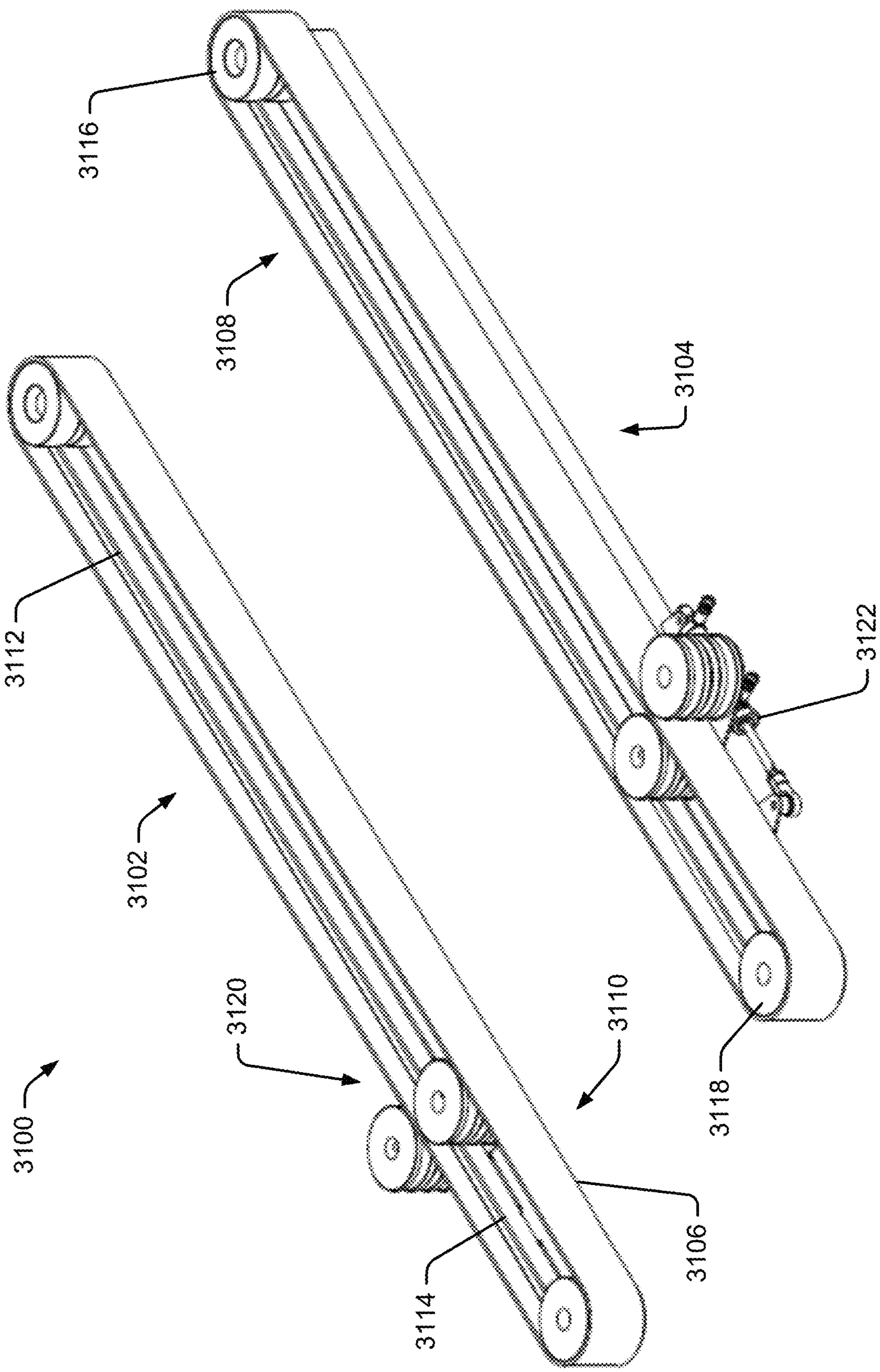
FIG. 33 is an isometric view of the pivoting side belt guide system, with the pivoting guide portions in the closed position.

FIG. 33 is an isometric view of the pivoting guide portions in the closed position.

Figure 34:
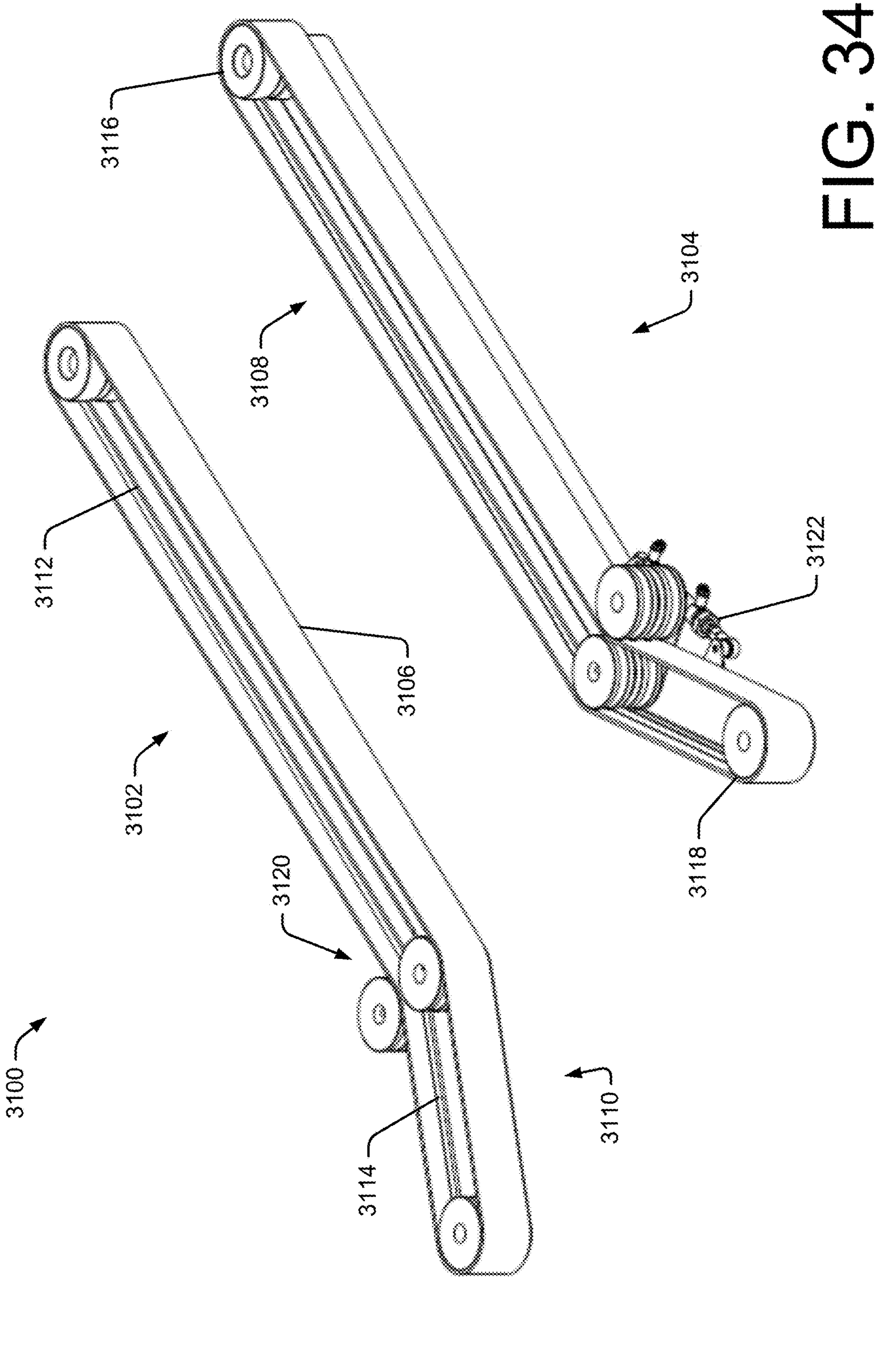
FIG. 34 an isometric view of the pivoting side belt guides with the pivoting guide portions in the open position.

FIG. 34 is an isometric view of the pivoting guide portions in the open position.

Example Methods

FIGS. 2-8, 20-23, 25-30, and 31-32 show sequences of movement and example methods to operate an H-bot device and belt and/or chain drives in a conveyor assembly for the purposes of erecting and moving cases. The methods and operation may be performed and/or directed by any desired integrated circuit, logic devices, processor-executed software programming, etc. The example methods of FIGS. 2-8, 20-23, 25-30, and 31-32 may be implemented at least in part using the techniques of FIGS. 1-34. However, the methods of FIGS. 2-8, 20-23, 25-30, and 31-32 contain general applicability, and are not limited by other drawing figures and/or prior discussion. The methods discussed herein (which are illustrated and understood by reference to, and discussion of, FIGS. 1-34) may be implemented by software and/or hardware structures or devices, including those that are configured to operate a H-bot and/or conveying device(s). In one example, one or more methods may be implemented by a microprocessor, a ladder logic device, a microcontroller, application specific integrated circuit (ASIC) or other logic device, etc., one or more memory devices, computer-readable media, software blocks, subroutines, programs, etc.

Computer-readable media, as the term is used herein, includes, at least, two types of computer-readable media, namely computer storage media and communications media. Computer storage media includes volatile and non-volatile, removable, and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

Computer storage media may be non-transitory in nature. In contrast, communication media may embody computer readable instructions, data structures, program modules, or other data in a modulated data signal, such as a carrier wave, or other transmission mechanism. As defined herein, computer storage media is non-transitory does not include communications media.

In the method of FIGS. 2-8 a case is erected by an H-bot. In FIG. 2, a grasping tool supported and moved by the H-bot grasps a case. In FIGS. 3-5, the grasping tool 102 moves the case. At FIG. 6, the case 106 has moved 90 clockwise and also to the right. While the grasping tool continues to grasp a first major-panel and an adjacent minor-panel of the case, a stationary tool grasps the opposite major-panel of the case. At FIG. 7, the grasping tool continues to hold the first major-panel and begins to open the case. At FIG. 8, the case is fully open, and the angle between all adjacent sides is 90-degrees.

In the method of FIGS. 20-23 a grasping tool (e.g., the grasping tool 102 of FIGS. 2-8) is rotated 135 degrees to illustrate the "virtual cam" structure, techniques, and method. In FIG. 20, the grasping tool 102 oriented to the lower left (the direction of the suction cups) and the rotation arm 1904 is oriented to the upper right. A pin 1906 of the rotation arm 1904 slides in the track 1910 of the rotation-control beam 1908. In FIG. 21, the rotation control beam 1908 moves down and the supporting beam 118 moves to the right. Accordingly, the orientation of the suction cups of the grasping tool is to the left and the location of the grasping tool has moved to the right. In FIG. 22, the supporting beam continues to move right, moving the grasping tool right, while the rotation-control beam moves down, rotating the grasping tool clockwise. In FIG. 23, the supporting beam continues to move further to the right, moving the grasping tool further to right, while the rotation-control beam moves further downwardly, rotating the grasping tool clockwise to orient the suction cups in an upward direction (from the perspective of the plan view).

In the method of FIGS. 25-30 a pivoting chain-drive system 2400—having left and right pivoting end portions 2410, 2412 of pivoting side belt guides 3102, 3104—is configured to move between an "open" configuration to allow room for case erection, and a "closed" configuration to position the pivoting end portions to propel a case within a conveyor system. In FIG. 25, the pivoting end portions are in the open position to allow room to erect a case. A rack 124 of cases 106 is available, but a case has not yet been removed from the rack. In FIG. 26, a first case has been removed. The case may be moved by the grasping tool of FIGS. 1-23, or by a similar or different tool. In FIGS. 27 and 28, the case continues to move. As seen in FIGS. 27 and 28, the case 106 is provided with sufficient room/space to move during the rotation because the left and right pivoting end portions 2410, 2412 have pivoted into the open position. In FIG. 29, the case has been rotated 90-degrees and attached to the stationary tool (not shown). Because the rotation is complete, the left and right pivoting end portions 2410, 2412 of the left and right pivoting chain guides 2402, 2404 have moved into the closed configuration. In FIG. 30, the case 106 has been erected, and is in contact with both the left and right pivoting end portions 2410, 2412, which in the closed position are separated from each other by a distance of the minor panel of the case 106.

The method of FIGS. 31-32 is similar to the method of FIGS. 25-30, except that a belt drive is substituted for a chain drive. In the method, the left and right pivoting end portions are configured to move between an "open" configuration and a "closed" position as a case is assembled and transported, respectively.

Example Systems and Devices

The following examples of an H-bot to erect folded-flat cases, a grasping tool configured for rotation, pivoting chain guide system, and a pivoting belt guide system are expressed as number clauses. While the examples illustrate a number of possible configurations and techniques, they are not meant to be an exhaustive listing of the systems, methods, devices, and/or techniques described herein.

1. A case-erection apparatus, comprising: a grasping tool configured to grasp a case; a supporting beam configured to support the grasping tool, and configured for movement of the grasping tool in two directions in a first dimension; a second tool, configured for grasping the case; and first and second beams configured for movement of the supporting beam in two directions in a second dimension, wherein the first dimension and the second dimension are perpendicular, wherein the case-erection apparatus is configured to move the grasping tool to perform movements, comprising: a first movement to move the case in a folded-flat configuration into contact with the second tool; and a second movement to open the case while the second tool remains stationary.

2. The case-erection apparatus of clause 1, wherein: the grasping tool is configured to grasp a first panel of the case and a second panel of the case, wherein the first panel and the second panel are adjacent panels and are separated by a fold; the second tool is configured for grasping one panel of the case.

3. The case-erection apparatus of clause 1, wherein the grasping tool is configured to perform movements, comprising: grasping a first panel of the case and a second panel of the case, wherein the first panel and the second panel are adjacent panels and are separated by a fold; and releasing grasp of the second panel prior to starting the second movement.

4. The case-erection apparatus of clause 1, additionally comprising: a rotation-control beam slidably moveable in either of the first dimension or the second dimension, wherein a slot is defined in a lengthwise direction of the rotation-control beam; a rotation arm attached to the grasping tool at a first end and having a pin attached to a second end, wherein the pin slides within the slot, wherein the grasping tool is rotated by movement of the rotation-control beam during the first movement.

5. The case-erection apparatus of clause 1, additionally comprising: left and right pivoting end portions of respective left and right guides, wherein the left and right pivoting end portions are in an open position, and wherein the second movement erects the case in an area between the left and right pivoting end portions while they are in the open position.

6. The case-erection apparatus of clause 1, additionally comprising: left and right pivoting end portions of respective left and right guides, wherein the left and right pivoting end portions are configured to transition between an open configuration and a closed configuration, and wherein the left and right guides move the case after the second movement opens the case.

7. The case-erection apparatus of clause 1, wherein: the grasping tool is additionally configured with at least two suction cups positioned to allow at least one suction cup to be attached to each of two adjacent panels of the case.

8. A case-erection apparatus, comprising: a grasping tool configured to grasp a case; an H-Bot assembly comprising: a supporting beam configured to support the grasping tool, and configured for movement of the grasping tool in two directions in a first dimension; first and second beams configured to support the supporting beam for movement in two directions in a second dimension, wherein the first dimension and the second dimension are perpendicular; and a rotation-control beam defining a slot within which a pin of a rotation arm of the grasping tool slides; a second tool, configured for grasping the case; and programming defined in memory and executed by a processor of the case-erection apparatus, and configured to move the grasping tool to perform movements, comprising: a first movement to move the case in a folded-flat configuration into contact with the second tool; and a second movement to open the case while the second tool remains stationary.

9. The case-erection apparatus of clause 8, wherein: the grasping tool is configured to grasp a first panel of the case and a second panel of the case, wherein the first panel and the second panel are adjacent panels and are separated by a fold; the second tool is configured for grasping one panel of the case.

10. The case-erection apparatus of clause 8, wherein the grasping tool is configured to perform movements, comprising: grasping a first panel of the case and a second panel of the case, wherein the first panel and the second panel are adjacent panels and are separated by a fold; and releasing grasp of the second panel prior to starting the second movement.

11. The case-erection apparatus of clause 8, wherein the programming of the case-erection apparatus is additionally configured to move the grasping tool to perform movements, comprising: releasing the case after it is opened; and moving into a position at which the grasping tool can grasp a second case.

12. The case-erection apparatus of clause 8, additionally comprising: left and right pivoting end portions of respective left and right guides, wherein the left and right pivoting end portions are in an open position, and wherein the second movement erects the case in an area between the left and right pivoting end portions while they are in the open position.

13. The case-erection apparatus of clause 8, additionally comprising: left and right pivoting end portions of respective left and right guides, wherein the left and right pivoting end portions are configured to transition between an open configuration and a closed configuration, and wherein the left and right guides move the case after the second movement opens the case.

14. The case-erection apparatus of clause 8, wherein: the grasping tool is additionally configured with at least two suction cups positioned to allow at least one suction cup to be attached to each of two adjacent panels of the case.

15. A case-erection apparatus, comprising: a grasping tool configured to grasp a case, wherein the grasping tool is additionally configured with at least two suction cups positioned to allow at least one suction cup to be attached to each of two adjacent panels of the case; a supporting beam configured to support the grasping tool, and configured for movement of the grasping tool in two directions in a first dimension; a second tool, configured for grasping the case; and first and second beams configured to support the supporting beam for movement in two directions in a second dimension, wherein the first dimension and the second dimension are perpendicular, programming defined in memory and executed by a processor of the case-erection apparatus, and configured to move the grasping tool to perform movements, comprising: a first movement to move the case in a folded-flat configuration into contact with the second tool; and a second movement to open the case while the second tool remains stationary.

16. The case-erection apparatus of clause 15, wherein: the grasping tool is configured to grasp a first panel of the case and a second panel of the case, wherein the first panel and the second panel are adjacent panels and are separated by a fold; the second tool is configured for grasping one panel of the case.

17. The case-erection apparatus of clause 15, wherein the grasping tool is configured to perform movements, comprising: grasping a first panel of the case and a second panel of the case, wherein the first panel and the second panel are adjacent panels and are separated by a fold; and releasing grasp of the second panel prior to starting the second movement.

18. The case-erection apparatus of clause 15, additionally comprising: a rotation-control beam slidably moveable in either of the first dimension or the second dimension, wherein a slot is defined in a lengthwise direction of the rotation-control beam; a rotation arm attached to the grasping tool at a first end and having a pin attached to a second end, wherein the pin slides within the slot, wherein the grasping tool is rotated by movement of the rotation-control beam during the first movement.

19. The case-erection apparatus of clause 15, additionally comprising: left and right pivoting end portions of respective left and right guides, wherein the left and right pivoting end portions are in an open position, and wherein the second movement erects the case in an area between the left and right pivoting end portions while they are in the open position.

20. The case-erection apparatus of clause 15, additionally comprising: left and right pivoting end portions of respective left and right guides, wherein the left and right pivoting end portions are configured to transition between an open configuration and a closed configuration, and wherein the left and right guides move the case after the second movement opens the case.

21. An H-bot to erect folded-flat cases, comprising: a grasping tool; a supporting beam configured for movement of the grasping tool in two directions in a first dimension; and first and second beams configured for movement of the supporting beam in two directions in a second dimension.

22. An H-bot to erect folded-flat cases, comprising: a grasping tool configured with a rotation arm; a rotation-control beam defining a track; a pin connected to the rotation arm and configured to slide within the track; and a motor to drive the rotation-control beam in two directions in one dimension, to thereby rotate the grasping tool.

23. A pivoting chain guide system, comprising: a left chain guide having a left pivoting end portion; a right chain guide having a right pivoting end portion; and left and right actuators, to control positions of the left and right pivoting end portions, respectively, wherein the left and right actuators configure the left and right chain guides between open and closed configurations, wherein the open configuration is sized for case erection and the closed configuration is sized for case movement in a conveyor system.

24. A pivoting belt guide system, comprising: a left belt guide having a left end portion; a right belt guide having a right end portion; and left and right actuators, to control positions of the left and right end portions, respectively, wherein the left and right actuators configure the left and right belt guides between open and closed configurations, wherein the open configuration is sized for case erection and the closed configuration is sized for case movement in a conveyor system.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A case-erection apparatus, comprising:

a grasping tool comprising at least one suction cup to grasp a case;

an H-Bot assembly comprising:

a supporting beam comprising a pivot connected to support the grasping tool, wherein the supporting beam allows movement of the grasping tool in two directions in a first dimension;

first and second beams comprising fasteners connected to support the supporting beam for movement by the supporting beam in two directions in a second dimension, wherein the first dimension and the second dimension are perpendicular; and a rotation-control beam defining a slot within which a pin of a rotation arm of the grasping tool slides;

a second tool, configured for grasping the case, wherein the second tool is fastened in a stationary position; and programming defined in memory and executed by a processor of the case-erection apparatus, and configured to move the grasping tool to perform movements, comprising:

a first movement to move the case in a folded-flat configuration into contact with the second tool; and a second movement to open the case while the second tool remains stationary;

wherein the first movement and the second movement are both responsive to movements comprising:

movement of the supporting beam with respect to the first and second beams; and movement of the grasping tool along the supporting beam; wherein a movement of the rotation-control beam moves the pin of the rotation arm of the grasping tool.

2. The case-erection apparatus of claim 1, wherein:

the grasping tool is configured to grasp a first panel of the case and a second panel of the case, wherein the first panel and the second panel are adjacent panels and are separated by a fold;

the second tool is configured for grasping one panel of the case.

3. The case-erection apparatus of claim 1, wherein the grasping tool is configured to perform movements, comprising:

grasping a first panel of the case and a second panel of the case, wherein the first panel and the second panel are adjacent panels and are separated by a fold; and releasing grasp of the second panel prior to starting the second movement.

4. The case-erection apparatus of claim 1, wherein the programming of the case-erection apparatus is additionally configured to move the grasping tool to perform movements, comprising:

releasing the case after it is opened; and moving into a position at which the grasping tool can grasp a second case.

5. The case-erection apparatus of claim 1, additionally comprising:

left and right pivoting end portions of respective left and right guides, wherein the left and right pivoting end portions are in an open position, and wherein the second movement erects the case in an area between the left and right pivoting end portions while they are in the open position.

6. The case-erection apparatus of claim 1, additionally comprising:

left and right pivoting end portions of respective left and right guides, wherein the left and right pivoting end portions are configured to transition between an open configuration and a closed configuration, and wherein the left and right guides move the case after the second movement opens the case.

7. The case-erection apparatus of claim 1, wherein:

the grasping tool is additionally configured with at least two suction cups positioned to allow at least one suction cup to be attached to each of two adjacent panels of the case.

8. A case-erection apparatus, comprising:

a grasping tool configured to grasp a case, wherein the grasping tool comprising at least two suction cups positioned to allow at least one suction cup to be attached to each of two adjacent panels of the case;

an H-Bot assembly comprising:

a supporting beam configured to support the grasping tool, and configured for movement of the grasping tool in two directions in a first dimension;

first and second beams configured to support the supporting beam for movement by the supporting beam in two directions in a second dimension, wherein the first dimension and the second dimension are perpendicular; and a rotation-control beam defining a slot within which a pin of a rotation arm of the grasping tool slides;

a second tool, configured for grasping the case; and programming defined in memory and executed by a processor of the case-erection apparatus, and configured to move the grasping tool to perform movements, comprising:

a first movement to move the case in a folded-flat configuration into contact with the second tool; and a second movement to open the case while the second tool remains stationary;

wherein the first movement and the second movement are both responsive to movements comprising:

movement of the supporting beam with respect to the first and second beams; and movement of the grasping tool along the supporting beam; wherein a movement of the rotation-control beam moves the pin of the rotation arm of the grasping tool.

9. The case-erection apparatus of claim 8, wherein:

the grasping tool is configured to grasp a first panel of the case and a second panel of the case, wherein the first panel and the second panel are adjacent panels and are separated by a fold;

the second tool is configured for grasping one panel of the case.

10. The case-erection apparatus of claim 8, wherein the grasping tool is configured to perform movements, comprising:

grasping a first panel of the case and a second panel of the case, wherein the first panel and the second panel are adjacent panels and are separated by a fold; and releasing grasp of the second panel prior to starting the second movement.

11. The case-erection apparatus of claim 8, additionally comprising:

left and right pivoting end portions of respective left and right guides, wherein the left and right pivoting end portions are in an open position, and wherein the second movement erects the case in an area between the left and right pivoting end portions while they are in the open position.

12. The case-erection apparatus of claim 8, additionally comprising:

left and right pivoting end portions of respective left and right guides, wherein the left and right pivoting end portions are configured to transition between an open configuration and a closed configuration, and wherein the left and right guides move the case after the second movement opens the case.

* * * * *